(12) United States Patent
Kanai et al.

(10) Patent No.: US 11,633,851 B2
(45) Date of Patent: Apr. 25, 2023

(54) CONTROL METHOD FOR ROBOT SYSTEM

(71) Applicant: Seiko Epson Corporation, Tokyo (JP)

(72) Inventors: Hiroyuki Kanai, Shiojiri (JP);
Shunsuke Toshimitsu, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 232 days.

(21) Appl. No.: 17/104,211

(22) Filed: Nov. 25, 2020

(65) Prior Publication Data

US 2021/0162591 A1    Jun. 3, 2021

(30) Foreign Application Priority Data

Nov. 29, 2019  (JP) .............................. JP2019-216058

(51) Int. Cl.
*G05D 1/00* (2006.01)
*B25J 9/16* (2006.01)
*B25J 13/08* (2006.01)
*B25J 19/00* (2006.01)

(52) U.S. Cl.
CPC ............. *B25J 9/162* (2013.01); *B25J 13/089* (2013.01); *B25J 19/0025* (2013.01)

(58) Field of Classification Search
CPC ....... G05B 19/418; G05D 1/0016; B60K 1/04
USPC ................ 700/245; 180/167; 901/9; 711/154
See application file for complete search history.

(56) References Cited

U.S. PATENT DOCUMENTS

| 10,916,073 | B2* | 2/2021 | Tonshal ................ G07C 5/0808 |
| 11,063,901 | B2* | 7/2021 | Nakamura ........... H04L 61/2503 |
| 11,084,392 | B2* | 8/2021 | Hou ...................... H02J 7/0045 |
| 11,100,340 | B2* | 8/2021 | Tamaru ................ G06V 20/588 |
| 2019/0126775 | A1* | 5/2019 | Han ....................... B60L 3/0046 |

FOREIGN PATENT DOCUMENTS

JP       2008-260117 A    10/2008

* cited by examiner

*Primary Examiner* — Dalena Tran
(74) *Attorney, Agent, or Firm* — Gang Yu

(57) ABSTRACT

A robot system includes a robot arm driven by an electric motor and a vehicle that is movable and supports the robot arm. A control method includes (a) moving the vehicle to a work station of a first type and (b) driving the robot arm in the work station of the first type. The (a) executes a first operation mode for, in a part of the movement to the work station of the first type, moving the vehicle in a state in which electric power is not supplied to the electric motor, starting supply of the electric power to the electric motor during the movement of the vehicle in the state in which the electric power is not supplied to the electric motor, and arranging the vehicle in the work station of the first type in a state in which the electric power is supplied to the electric motor.

7 Claims, 14 Drawing Sheets

CONTROL METHOD FOR ROBOT SYSTEM

The present application is based on, and claims priority from JP Application Serial Number 2019-216058, filed Nov. 29, 2019, the disclosure of which is hereby incorporated by reference herein in its entirety.

BACKGROUND

1. Technical Field

The present disclosure relates to a control method for a robot system.

2. Related Art

There has been a robot including a moving mechanism. In a technique described in JP-A-2008-260117 (Patent Literature 1), in a leg-wheel type robot including leg sections, a motor stop signal for stopping rotation of joint motors of the leg sections is output to a driver when the leg sections are in a retracted position. As a result, supply of electric power for driving the joint motors of the leg sections is stopped to reduce a driving power amount.

In the technique described in Patent Literature 1, the stop of the supply of the electric power to the joint motors of the leg sections used for movement of the robot is described. However, electric power consumed by a robot arm, which executes work after completion of the movement of the robot, is not considered. Accordingly, the inventors of this application examined a technique for, in a robot including a robot arm and a moving mechanism, stopping supply of electric power to an electric motor for driving joints of the robot arm during movement of the robot. However, it takes time until the robot arm becomes operable after the supply of the electric power to the electric motor for driving the joints of the robot arm is started. Therefore, in such a technique, a start of the work after the completion of the movement of the robot is delayed.

SUMMARY

According to an aspect of the present disclosure, a control method for a robot system is provided. The robot system includes: a robot arm driven by an electric motor; and a vehicle that is movable and supports the robot arm. The control method includes: (a) moving the vehicle to a work station of a first type; and (b) driving the robot arm in the work station of the first type. The (a) executes a first operation mode for, in a part of the movement to the work station of the first type, moving the vehicle in a state in which electric power is not supplied to the electric motor, starting supply of the electric power to the electric motor during the movement of the vehicle in the state in which the electric power is not supplied to the electric motor, and arranging the vehicle in the work station of the first type in a state in which the electric power is supplied to the electric motor.

DESCRIPTION OF EXEMPLARY EMBODIMENTS

A. First Embodiment

A1. Configuration of a Robot System

Figure 1:
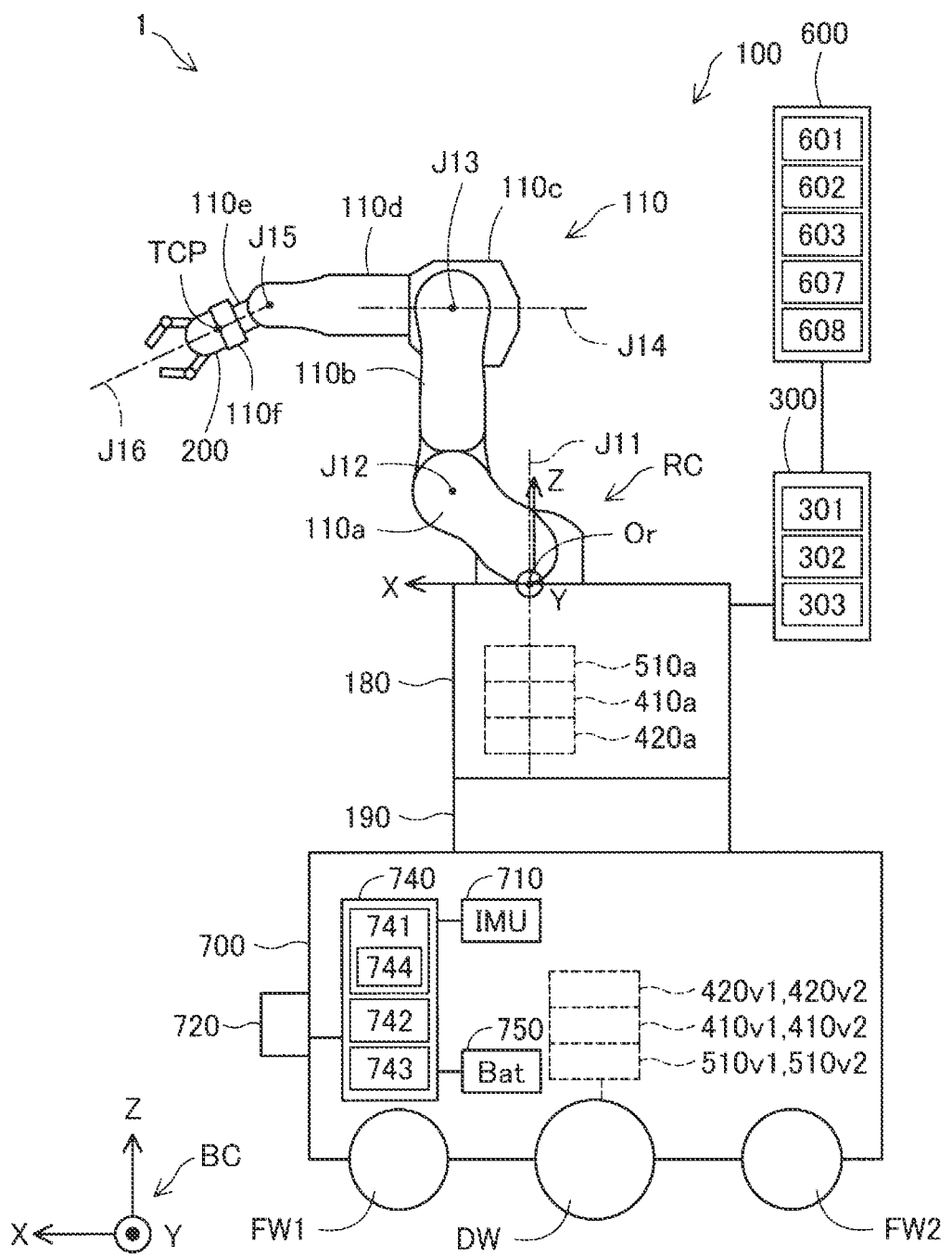
FIG. 1 is an explanatory diagram schematically showing an autonomous mobile robot in a first embodiment.

FIG. 1 is an explanatory diagram schematically showing an autonomous mobile robot 1 in a first embodiment. The autonomous mobile robot 1 receives an instruction of a host management device 600 and autonomously operates. The autonomous mobile robot 1 is a so-called AMR. The autonomous mobile robot 1 includes a robot 100, an end effector 200, an operation control device 300, and a vehicle 700.

In FIG. 1, in order to facilitate understanding of a technique, a reference coordinate system BC and a robot coordinate system RC are shown. The reference coordinate system BC is a three-dimensional orthogonal coordinate system defined by an X axis and a Y axis orthogonal to each other on a plane on which the autonomous mobile robot 1 moves and a Z axis, a positive direction of which is the vertical upward direction. The reference coordinate system BC is decided for each of work stations WS. The work stations WS are places where the autonomous mobile robot 1 performs work. The work stations WS are explained below.

The robot coordinate system RC is a coordinate system fixed with respect to the autonomous mobile robot 1. The upward direction of the autonomous mobile robot 1 is a Z-axis positive direction. The forward direction of the autonomous mobile robot 1 is an X-axis positive direction. A direction perpendicular to the Z axis and the X axis is a Y-axis positive direction. An origin Or of the robot coordinate system RC is a point located on a rotation axis of a joint J11 and in a base 180. The base 180 and the joint J11 are explained below. Both of the reference coordinate system BC and the robot coordinate system RC are right-handed systems.

The robot 100 is a vertical articulated robot. The robot 100 includes a robot arm 110, a base 180, and a force detecting section 190.

The robot arm 110 is supported by the base 180. The robot arm 110 can move the end effector 200 attached to the distal end portion of the robot arm 110. The robot arm 110 includes arm elements 110a to 110f and joints J11 to J16. That is, the robot 100 is a six-axis robot including the robot arm 110 including six joints J11 to J16.

The joints J12, J13, and J15 are bending joints. The joints J11, J14, and J16 are twist joints. The base 180 and the arm element 110a are coupled via the joint J11. The arm element 110a and the arm element 110b are coupled via the joint J12. The arm element 110b and the arm element 110c are coupled via the joint J13. The arm element 110c and the arm element 110d are coupled via the joint J14. The arm element 110d and the arm element 110e are coupled via the joint J15. The arm element 110e and the arm element 110f are coupled via the joint J16. The end effector 200 is coupled to the arm element 110f on the opposite side of the arm element 110e.

The joints J11 to J16 include servomotors 410, encoders 420, and speed reducers 510. The servomotors 410 are controlled by the operation control device 300 and rotate output shafts of the servomotors 410. The servomotors 410 include brakes. When electric power is not supplied to the servomotors 410, angle positions of the output shafts of the servomotors 410 are kept by the brakes. When electric power is supplied to the servomotors 410, the brakes are released.

The speed reducers 510 decelerate the rotation of the output shafts of the servomotors 410 and transmit the rotation to the arm elements. That is, the robot arm 110 is driven by the servomotors 410. The encoders 420 detect rotation angles of the output shafts of the servomotors 410.

In FIG. 1, a servomotor 410a, an encoder 420a, and a speed reducer 510a for driving the joint J11 are denoted by reference numerals and shown. To facilitate understanding of the technique, illustration is omitted about the servomotors 410, the encoders 420, and the speed reducers 510 for driving the joints J12 to J16. In this specification, when the servomotors of the joints are referred to without being distinguished from one another, the servomotors are describe as servomotor 410. When the encoders of the joints are referred to without being distinguished from one another, the encoders are described as encoder 420. When the speed reducers of the joints are referred to without being distinguished from one another, the speed reducers are described as speed reducer 510.

The force detecting section 190 is provided in a lower part of the base 180. The force detecting section 190 can detect force applied to the robot arm 110. More specifically, the force detecting section 190 can detect forces in three axial directions of the X axis, the Y axis, and the Z axis and torques around a U axis, a V axis, and a W axis serving as rotation axes applied from the outside, that is, components other than the force detecting section 190. As a result, the force detecting section 190 can measure forces in the three axial directions of the X axis, the Y axis, and the Z axis and torques around the U axis, the V axis, and the W axis acting on the robot arm 110, which is a component other than the force detecting section 190. An output of the force detecting section 190 is transmitted to the operation control device 300 and used for control of the robot 100. The operation control device 300 can execute force control based on the output of the force detecting section 190.

The robot 100 can arrange the end effector 200, which is attached to the distal end portion of the robot arm 110, at a target point, which is a designated position in a three-dimensional space, in a designated posture by respectively rotating the six joints J11 to J16 of the robot arm 110 with the servomotors. A point representing a position of the end effector 200 in the three-dimensional space is called TCP (Tool Center Point) as well. In FIG. 1, the TCP serving as a control point is shown.

The end effector 200 is attached to the distal end of the robot arm 110. The end effector 200 is controlled by the operation control device 300 to be able to grip a workpiece, which is a work target object, and release the gripped workpiece. As a result, for example, the end effector 200 and the robot 100 are controlled by the operation control device 300 to be able to grip and move the workpiece.

The operation control device 300 is a control device that controls the operations of the robot 100 and the end effector 200. The operation control device 300 is coupled to the robot 100. The operation control device 300 is fixed to the vehicle 700 together with the robot 100.

The operation control device 300 includes a CPU (Central Processing Unit) 301, which is a processor, a RAM (Random Access Memory) 302, and a ROM (Read-Only Memory) 303. A control program for controlling the robot 100 is installed in the operation control device 300. In the operation control device 300, the CPU 301, the RAM 302, and the ROM 303 functioning as hardware resources and the control program cooperate. Specifically, the CPU 301 loads a computer program stored in the ROM 303 onto the RAM 302 and executes the computer program to thereby realize various functions.

The vehicle 700 supports the robot arm 110 via the force detecting section 190 and the base 180. The vehicle 700 can move the robot 100 to any position on a floor surface. The vehicle 700 includes one pair of driving wheels DW, two pairs of driven wheels FW1 and FW2, servomotors 410v1 and 410v2, encoders 420v1 and 420v2, speed reducers 510v1 and 510v2, an inertial measurement unit (IMU) 710, a camera 720, a vehicle control section 740, and a storage battery 750.

The servomotors 410v1 and 410v2 are controlled by the operation control device 300 to rotate output shafts of the servomotors 410v1 and 410v2. The speed reducers 510v1 and 510v2 decelerate the rotation of the output shafts of the servomotors 410v1 and 410v2 and transmit the rotation to the two driving wheels DW. The rotation is transmitted to the two driving wheels DW from the speed reducers 510v1 and 510v2 to drive the two driving wheels DW. The encoders 420v1 and 420v2 respectively detect rotation angles of the output shafts of the servomotors 410v1 and 410v2. The two driving wheels DW can be respectively independently rotated by the servomotors 410v1 and 410v2. As a result, the vehicle 700 can move in any direction.

In this specification, when the servomotors 410v1 and 410v2 are referred to without being distinguished from each other, the servomotors 410v1 and 410v2 are described as servomotor 410v. When the encoders 420v1 and 420v2 are referred to without being distinguished from each other, the encoders 420v1 and 420v2 are described as encoder 420v.

When the speed reducers 510v1 and 510v2 are referred to without being distinguished from each other, the speed reducers 510v1 and 510v2 are described as speed reducer 510v.

The two pairs of driven wheels FW1 and FW2 support the vehicle 700 in conjunction with the one pair of driving wheels DW. The driven wheels FW1 and FW2 are applied with external force to rotate. The driven wheels FW1 and FW2 are not driven by a motor.

The IMU 710 can acquire information concerning accelerations in the X-axis direction, the Y-axis direction, and the Z-axis direction and angular velocities in the U-axis direction, the V-axis direction, and the W-axis direction of the vehicle 700. The vehicle control section 740 recognizes, based on those kinds of information, a tilt of the vehicle 700, moving speed including the speed and the direction of the vehicle 700, and a present position of the vehicle 700.

The camera 720 can acquire an image in a predetermine angle range in the forward direction of the vehicle 700, that is, the X-axis direction of the robot coordinate system. The vehicle control section 740 recognizes, based on data of the image generated by the camera 720, the moving speed including the speed and the direction of the vehicle 700 and the present position of the vehicle 700. That is, the camera 720 and the vehicle control section 740 function as a position detecting section that can detect the position of the vehicle 700.

The vehicle control section 740 is a control device that controls the operation of the vehicle 700. The vehicle control section 740 includes a CPU 741, which is a processor, a RAM 742, and a ROM 743. A control program for controlling the vehicle 700 is installed in the vehicle control section 740. In the vehicle control section 740, the CPU 741, the RAM 742, and the ROM 743 functioning as hardware resources and the control program cooperate. Specifically, the CPU 741 loads a computer program stored in the ROM 743 onto the RAM 742 and executes the computer program to thereby realize various functions.

The storage battery 750 stores energy for driving the robot 100 and the vehicle 700. The servomotor 410 of the robot 100 and the servomotor 410v of the vehicle 700 are supplied with electric energy from the storage battery 750 and driven.

The host management device 600 gives instructions to a plurality of autonomous mobile robots 1 and controls the autonomous mobile robots 1. The host management device 600 is coupled to the operation control device 300 of the robot 100 and the vehicle control section 740 of the vehicle 700. In FIG. 1, to facilitate understanding of the technique, only one autonomous mobile robot 1 is shown.

The host management device 600 includes a CPU 601, which is a processor, a RAM 602, a ROM 603, an input device 607, and an output device 608. A control program for controlling the plurality of autonomous mobile robots 1 is installed in the host management device 600. In the host management device 600, the CPU 601, the RAM 602, and the ROM 603 functioning as hardware resources and the control program cooperate. Specifically, the CPU 601 loads a computer program stored in the ROM 603 onto the RAM 602 and executes the computer program to thereby realize various functions.

The input device 607 receives an instruction from a user. The input device 607 is, for example, a mouse, a keyboard, or a touch panel. The output device 608 outputs various kinds of information to the user. The output device 608 is, for example, a display or a speaker.

Figure 2:
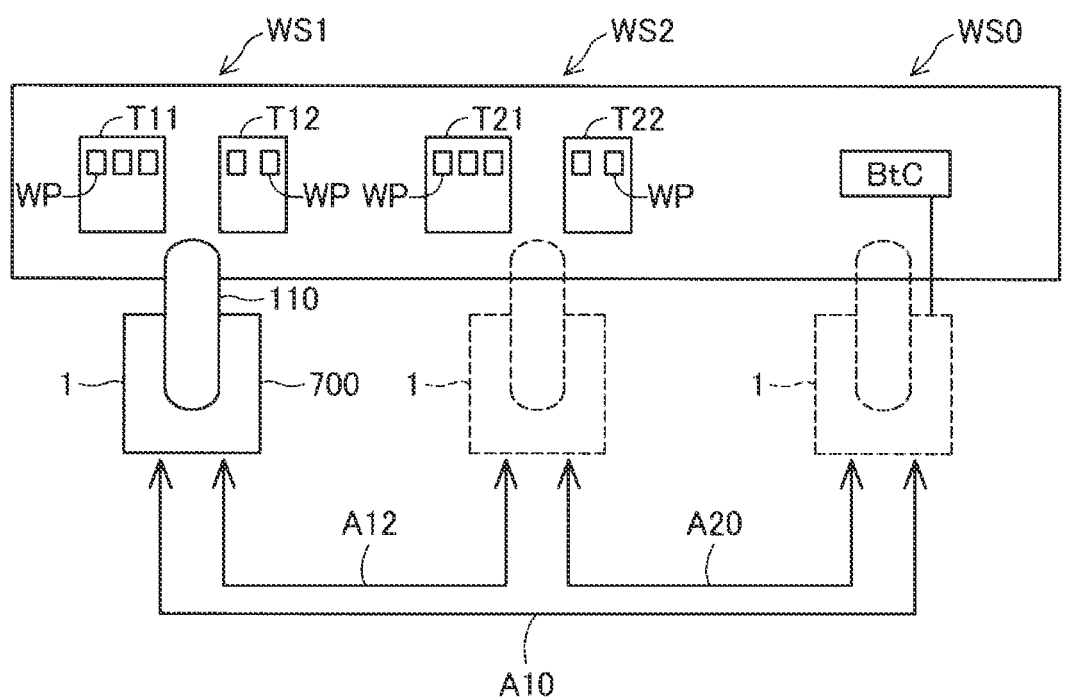
FIG. 2 is an explanatory diagram showing disposition of work stations and a state of movement of the autonomous mobile robot.

FIG. 2 is an explanatory diagram showing disposition of work stations WS1, WS2, and WS0 and a state of movement of the autonomous mobile robot 1. The work stations WS1, WS2, and WS0 are places where the autonomous mobile robot 1 performs work or predetermined processing is performed on the autonomous mobile robot 1. The work stations WS1, WS2, and WS0 are disposed in places different from one another. The autonomous mobile robot 1 moves among the work stations WS1, WS2, and WS0. In FIG. 2, the movement of the autonomous mobile robot 1 among the work stations WS1, WS2, and WS0 is indicated by arrows A12, A20, and A10.

Information concerning a route for moving among the work stations WS1, WS2, and WS0 is stored in the RAM 742 of the vehicle control section 740 in advance prior to the movement (see the lower center of FIG. 1). The CPU 741 controls the servomotors 410v1 and 410v2 based on the information concerning the route stored in the RAM 742 and information obtained from the IMU 710 and the camera 720 to move the vehicle 700 to the work station WS in which the next work should be performed. In this specification, when the work stations WS1, WS2, and WS0 are referred to without being distinguished from one another, the work stations WS1, WS2, and WS0 are described as work station WS.

The work station WS1 includes trays T11 and T12. One or more workpieces WP are disposed on the tray T11. The autonomous mobile robot 1 performs work for moving the workpieces WP from the tray T11 to the tray T12 in the work station WS1.

The work station WS2 has the same configuration as the configuration of the work station WS1. That is, the work station WS2 includes trays T21 and T22. The autonomous mobile robot 1 performs work for moving the workpieces WP from the tray T21 to the tray T22 in the work station WS2.

The work station WS0 is a charging station. In the work station WS0, charging to the storage battery 750 of the autonomous mobile robot 1 is performed by a charging device BtC (see the lower center of FIG. 1). The autonomous mobile robot 1 does not drive the robot arm 110 in the work station WS0.

Figure 3:
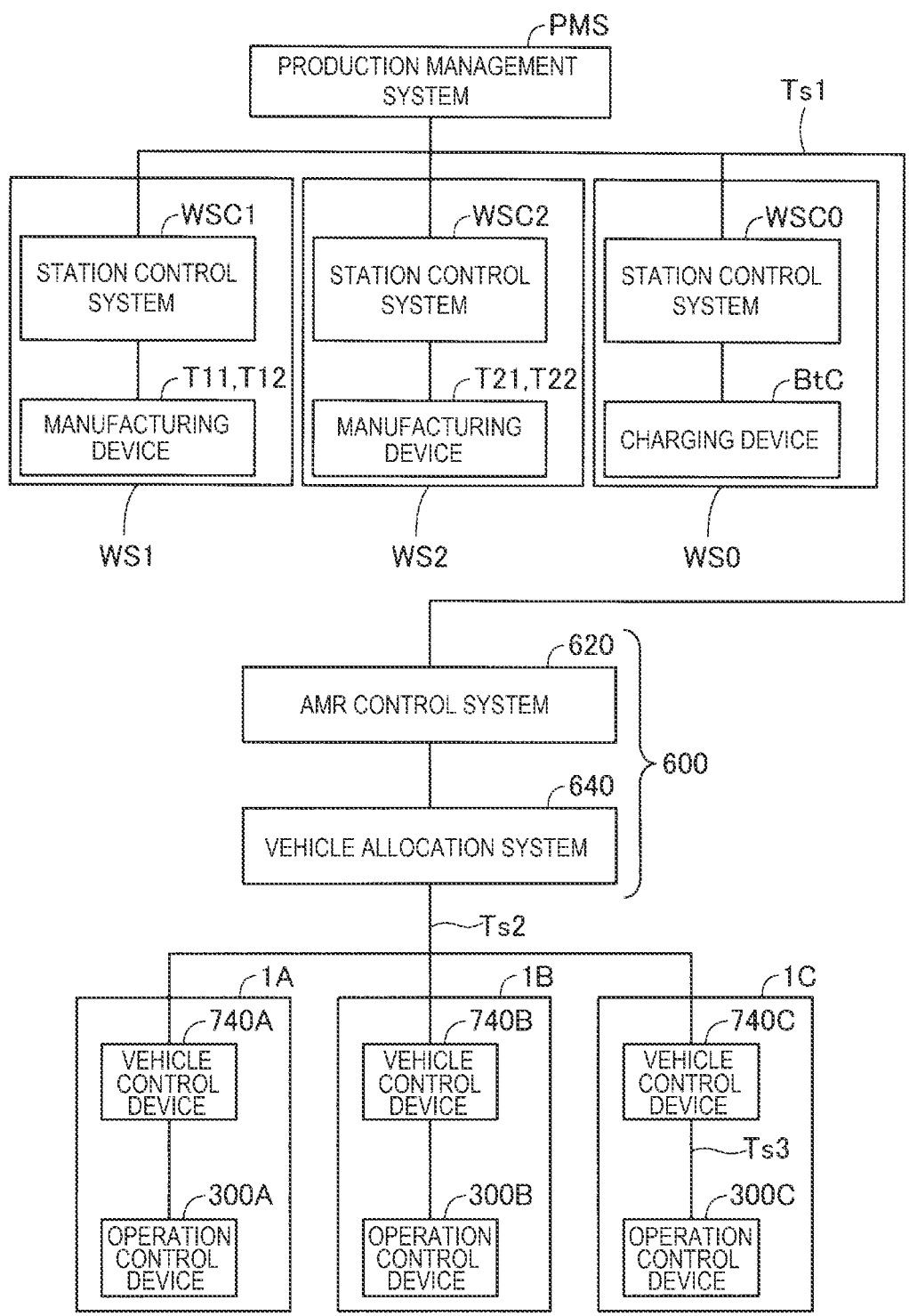
FIG. 3 is a block diagram showing the configuration of an entire production system including the autonomous mobile robot.

FIG. 3 is a block diagram showing the configuration of an entire production system including the autonomous mobile robot 1. The production system includes autonomous mobile robots 1A to 1C, the host management device 600, the work stations WS1, WS2, and WS0, and a production management system PMS.

The autonomous mobile robots 1A to 1C are the autonomous mobile robot 1 explained with reference to FIG. 1. In order to distinguish the autonomous mobile robots 1A to 1C from one another, reference signs 1A, 1B, and 1C are respectively attached to the three autonomous mobile robots. A, B, and C are respectively attached to the ends of the vehicle control sections 740 of the vehicles 700 and the operation control devices 300 of the robots 100 included in the autonomous mobile robots 1A, 1B, and 1C to distinguish the vehicle control sections 740 and the operation control devices 300.

The vehicle control section 740 of the vehicle 700 receives information from a vehicle allocation system 640 of the host management device 600. The operation control device 300 of the robot 100 receives the information via the vehicle control section 740 of the vehicle 700. Information Ts3 transmitted and received between the vehicle control section 740 of the vehicle 700 and the operation control device 300 of the robot 100 includes information concerning work content in the work station WS, information concerning a state of the vehicle 700, and information concerning a state of the robot 100.

The host management device 600 realizes functions of an AMR control system 620 and the vehicle allocation system 640.

The vehicle allocation system 640 monitors states of the autonomous mobile robots 1A to 1C. The vehicle allocation system 640 instructs, based on an instruction from the AMR control system 620, the autonomous mobile robots 1A to 1C about the work station WS in which work should be performed next. Information TS2 transmitted and received between the vehicle allocation system 640 and the vehicle control section 740 of the vehicle 700 includes information concerning the work station WS to which the vehicle 700 should move, work content in the work station WS, information concerning a state of the autonomous mobile robot 1, and, when the autonomous mobile robot 1 includes a tray for placing a workpiece, information concerning a state in the tray.

The AMR control system 620 accumulates information transmitted from the autonomous mobile robots 1A to 1C to the vehicle allocation system 640, generates information based on those kinds of information, and transmits the information to the production management system PMS. When receiving information concerning a work end about a certain autonomous mobile robot 1 from the vehicle allocation system 640, the AMR control system 620 transmits an instruction for the next work about the autonomous mobile robot 1 to the vehicle allocation system 640. When processing for collision avoidance occurs or a stop of operation due to an error occurs about the autonomous mobile robots 1A to 1C, the AMR control system 620 performs rescheduling about the autonomous mobile robots 1A to 1C.

The work station WS1 includes a manufacturing device and a station control system WSC1. In this embodiment, the manufacturing device is the trays T11 and T12 (see FIG. 2). The station control system WSC1 monitors a state of the manufacturing device and controls the manufacturing device. In this embodiment, the station control system WSC1 grasps the number of workpieces WP placed on the trays T11 and T12.

The work station WS2 includes a manufacturing device and a station control system WSC2. The configuration and functions of the work station WS2 are the same as the configuration and the functions of the work station WS1. The work stations WS1 and WS2 in which the autonomous mobile robot 1 drives the robot arm 110 and performs work are referred to as "work station of a first type" in this specification.

The work station WS0 includes the charging device BtC and a station control system WSC0. The station control system WSC0 monitors a state of the charging device BtC and controls the charging device BtC. The work station WS0 in which the robot arm 110 is not driven and processing concerning the autonomous mobile robot 1 is performed is referred to as "work station of a second type" in this specification.

Information Ts1 transmitted and received between the station control systems WSC1, WSC2, and WSC0 and the host management device 600 includes information concerning a replacement request for a tray from the work stations WS1, WS2, and WS0 and information concerning occurrence of an error in the work stations WS1, WS2, and WS0.

The production management system PMS gives instructions to the host management device 600 and the station control systems WSC1, WSC2, and WSC0 based on information provided from the host management device 600 and the station control systems WSC1, WSC2, and WSC0. The production management system PMS is, for example, an MES (Manufacturing Execution System) or an ERP (Enterprise Resource Planning) or both of the MES and the ERP.

A2. Operation of the Robot System

Figure 4:
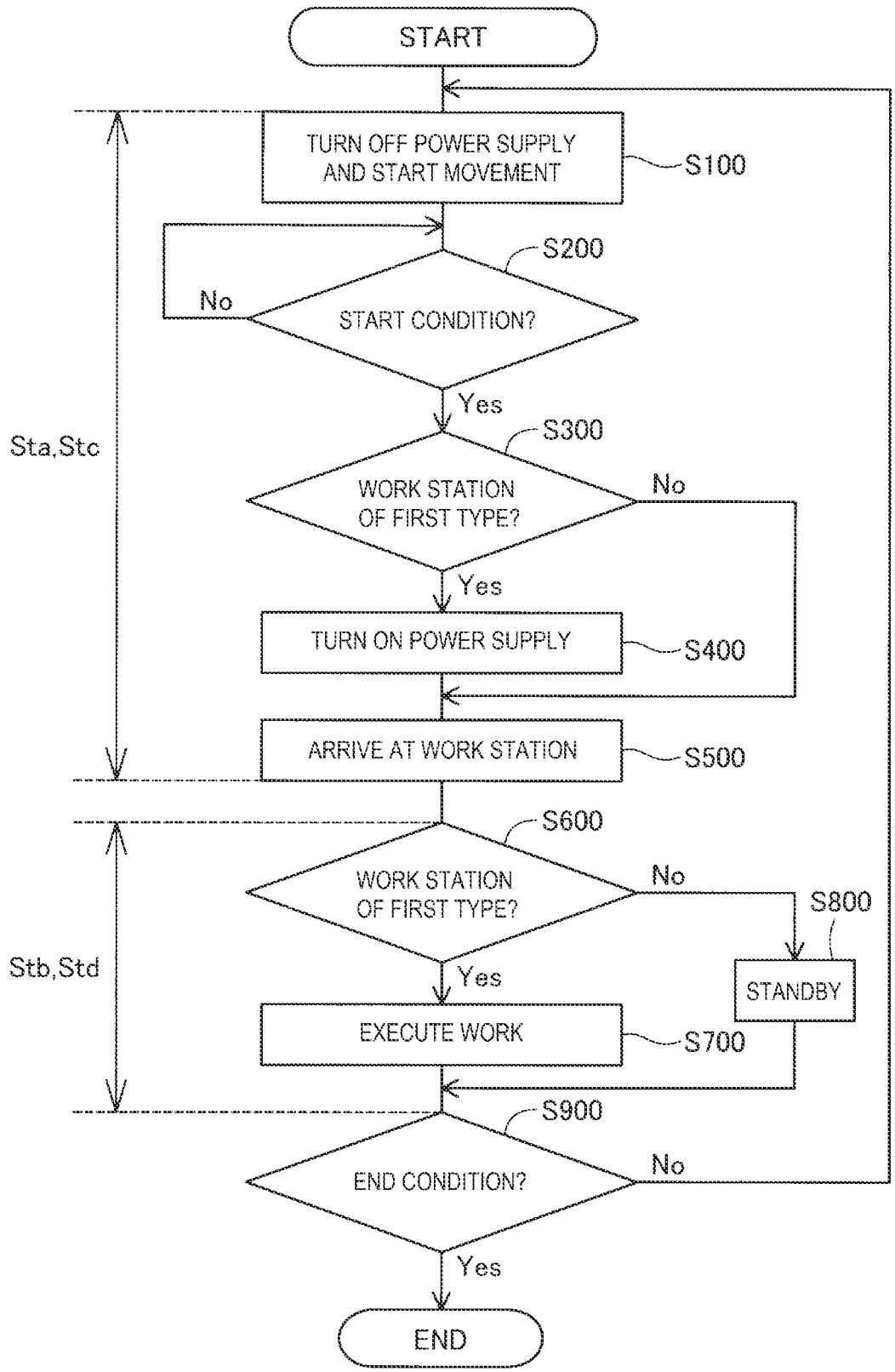
FIG. 4 is a flowchart showing a control method concerning control of power supply to a servomotor at the time when the autonomous mobile robot moves among the work stations.

FIG. 4 is a flowchart showing a control method concerning control of power supply to the servomotor 410 at the time when the autonomous mobile robot 1 moves among the work stations WS1, WS2, and WS0. Processing shown in FIG. 4 is executed mainly by the vehicle control section 740 of the vehicle 700, the operation control device 300 of the robot 100, and the vehicle allocation system 640 of the host management device 600 (see FIGS. 1 and 2).

Processing for performing work in the work stations WS1, WS2, and WS0 with the autonomous mobile robot 1 is substantially divided into the following steps. (i) A step of moving the vehicle 700 to the work station WS (see arrows A12, A20, and A10 in a lower part of FIG. 2). (ii) A step of driving the robot arm 110 to perform work in the work station WS1 or the work station WS2 or not driving the robot arm 110 and charging the autonomous mobile robot 1 in the work station WS0.

A step for moving the vehicle 700 to the work station WS of the first type is represented as a step Sta (see the middle left part of FIG. 4). A step of moving the vehicle 700 to the work station WS of the second type is represented as a step Stc (see the middle left part of FIG. 4). A step of driving the robot arm in the work station WS of the first type is represented as a step Stb (see the lower left part of FIG. 4). A step of not driving the robot arm 110 in the work station WS of the second type and charging the autonomous mobile robot 1 is represented as a step Std (see the lower left part of FIG. 4).

In step S100, prior to the vehicle control section 740 of the vehicle 700 starting movement of the vehicle 700 to the next work station WS, the operation control device 300 of the robot 100 controls the robot arm 110 to a predetermined posture and stops supply of electric power to the servomotor 410 of the robot arm 110. As a result, excitation of the servomotor 410 is turned off. While the excitation of the servomotor 410 is off, the output shafts of the servomotors 410 of the robot arm 110 are held by the brakes included in the servomotors 410. As a result, the posture of the robot arm 110 is also held.

Thereafter, the vehicle control section 740 starts movement of the vehicle 700 to the next work station WS. As a result, in a part of the movement to the work station WS including a movement start time, the vehicle 700 moves in a state in which electric power is not supplied to the servomotor 410 of the robot arm 110.

By performing such processing, it is possible to reduce electric power consumed by the robot arm 110 compared with a form of continuously supplying electric power to the servomotor 410 of the robot arm 110 while the vehicle 700 is moved. In this embodiment, specifically, it is possible to reduce electric power for causing the output shafts of the servomotors 410 of the robot arm 110 to stay at designated angle positions and electric power for holding the brakes of the output shafts of the servomotors 410 in releasing positions.

In step S200, the vehicle control section 740 determines whether a start condition for power supply to the servomotor 410 of the robot arm 110 is satisfied. The start condition is a condition concerning relative positions of the work station WS at a destination and the vehicle 700 moving along a route to the work station WS at the destination. Content of the start condition is explained below.

When the start condition is not satisfied, the processing returns to step S200. When the start condition is satisfied, the processing proceeds to step S300.

In step S300, the operation control device 300 determines whether the work station WS at the next destination is the work station WS1 or WS2 of the first type in which the autonomous mobile robot 1 drives the robot arm 110 and performs work. Specifically, the operation control device 300 performs the determination based on information concerning a type of the work station WS at the next destination included in an instruction received from the host management device 600.

When the work station WS at the next destination is not the work station WS1 or WS2 of the first type, that is, when the work station WS at the nest destination is the work station WS0 of the second type, the processing proceeds to step S500. When the work station WS at the next destination is the work station WS1 or WS2 of the first type, the processing proceeds to step S400.

In step S400, the operation control device 300 starts supply of electric power to the servomotor 410 of the robot arm 110. Through the processing in step S400, the supply of electric power to the servomotor 410 is started during movement of the vehicle 700 in the state in which electric power is not supplied to the servomotor 410. A fixed time is required until the robot arm 110 can be driven after the supply of electric power to the servomotor 410 is started.

In step S500, the vehicle 700 arrives at the work station WS.

When the processing reaches step S500 through step S400, the vehicle 700 is arranged in the work station WS1 or WS2 of the first type in a state in which electric power is supplied to the servomotor 410 of the robot arm 110.

By performing such processing, it is possible to advance start timing of work in the work station WS1 or WS2 of the first type compared with a form of starting the supply of electric power to the servomotor 410 after the vehicle 700 arrives at the work station WS1 or WS2 of the first type.

When the processing reaches step S500 not through step S400, the vehicle 700 is arranged in the work station WS0 of the second type in the state in which electric power is not supplied to the servomotor 410 of the robot arm 110.

By performing such processing, when the vehicle 700 is moved to the work station WS0 of the second type in which the robot arm 110 is not driven, the vehicle 700 is moved in the state in which electric power is not supplied to the servomotor 410 of the robot arm 110 (see S100 and S500 in FIG. 4). Accordingly, it is possible to reduce electric power consumed by the robot arm 110 compared with a form of supplying electric power to the servomotor 410 while the vehicle 700 is moved.

The processing in steps S100 to S500 is the steps Sta and Stc for moving the vehicle 700 to the work station WS.

In step S600, the operation control device 300 determines whether the work station WS at which the vehicle 700 arrives is the work station WS1 or WS2 of the first type. Specifically, the operation control device 300 performs the determination based on information concerning a type of the work station WS at the next destination included in an instruction received from the host management device 600. The vehicle control section 740 may store a determination result in step S300 in the RAM 742 and divert the determination result in step S300 as determination in step S600.

When the work station WS at which the vehicle 700 arrives is not the work station WS1 or WS2 of the first type, that is, when the work station WS at which the vehicle 700 arrives is the work station WS0 of the second type, the processing proceeds to step S800. When the work station WS at which the vehicle 700 arrives is the work station WS1 or WS2 of the first type, the processing proceeds to step S700.

In step S700, the operation control device 300 drives the robot arm 110 in the work station WS1 or WS2 of the first type and executes work (see the upper left part of FIG. 2).

In step S800, the operation control device 300 does not drive the robot arm 110 in the work station WS0 of the second type and stays on standby. During the standby, the station control system WSC0 of the work station WS0 charges the storage battery 750 of the autonomous mobile robot 1 with the charging device BtC (see the upper right part of FIG. 2).

The processing in steps S600 to S800 is the steps Stb and Std. More specifically, the processing in step S700 is the step Stb of driving the robot arm 110 in the work station WS of the first type. The processing in step S800 is the step Std of not driving the robot arm 110 and charging the autonomous mobile robot 1 in the work station WS of the second type.

In step S900, the vehicle control section 740 of the vehicle 700 determines whether all processing that should be executed in the work stations WS1, WS2, and WS0 has ended. Specifically, the vehicle control section 740 of the vehicle 700 determines whether an instruction indicating that all the processing that the autonomous mobile robot 1 should execute in the work stations WS1, WS2, and WS0 has ended is received from the host management device 600 or whether an instruction of the work station WS to which the autonomous mobile robot 1 should move is received from the host management device 600.

When all the processing that should be executed in the work stations WS1, WS2, and WS0 has ended, the processing ends. When not all of the processing that should be executed in the work stations WS1, WS2, and WS0 has been ended, the processing returns to step S100. That is, prior to the vehicle control section 740 of the vehicle 700 starting movement to the next work station WS, the operation control device 300 of the robot 100 stops the supply of electric power to the servomotor 410 of the robot arm 110.

Figure 5:
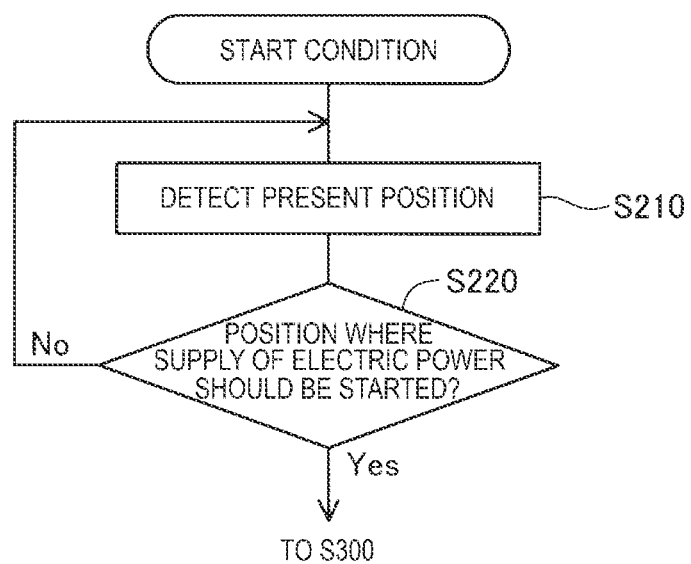
FIG. 5 is a flowchart showing content of determination processing for a start condition in step S200 in FIG. 4.

FIG. 5 is a flowchart showing content of the determination processing for the start condition in step S200 in FIG. 4. In step S210, the vehicle control section 740 detects a present position. More specifically, the vehicle control section 740 detects a present position of the vehicle 700 based on information acquired from the IMU 710 and the camera 720 (see 710 and 720 in FIG. 1).

In step S220, the vehicle control section 740 determines whether the present position is a position where power supply to the servomotor 410 should be started. Information concerning the position where power supply to the servomotor 410 should be started is stored in advance in the RAM 742 of the vehicle control section 740 together with information concerning a route for moving among the work stations WS1, WS2, and WS0 before movement to the work station WS at a destination is started.

The information concerning the position where power supply to the servomotor 410 should be started can be, for example, information concerning a marker provided in the route for moving among the work stations WS1, WS2, and WS0. When the present position is a position where a specific marker is photographed by the camera 720 in a specific size and at a specific angle, the vehicle control section 740 can determine that the present position is the position where power supply to the servomotor 410 should be started. The specific marker may not be provided. Components included in the work stations WS1, WS2, and WS0 and angles and sizes of the components photographed by a camera can be the information for specifying the position where power supply should be started.

With such information, for example, a position on the route, that is, a position present at a distance L from the work station WS in the opposite direction of a traveling direction of the vehicle 700 moving to the work station WS can be set as the position where power supply to the servomotor 410 should be started. The size of the distance L can be decided in advance based on a time from when the supply of electric power to the servomotor 410 is started until the robot arm 110 changes to a state in which the robot arm 110 can start work and speed of the movement of the vehicle 700.

When the present position is not the position where power supply to the servomotor 410 should be started, the processing returns to step S210. When the present position is the position where the power supply to the servomotor 410 should be started, the processing proceeds to step S300.

In this embodiment, when power supply conditions including a condition that the position of the vehicle 700 reaches the position where the supply of electric power should be started are satisfied during the movement of the vehicle 700, the supply of electric power to the servomotor 410 of the robot arm 110 is started (see S220 in FIGS. 5 and S200 to S400 in FIG. 4). By performing such processing, in an operable state of the robot arm 110, it is possible to arrange the vehicle 700 in the work station WS1 or WS2 of the first type by appropriately setting the position where the supply of electric power should be started. Accordingly, it is unnecessary to hold off a start of work in the work station WS1 or WS2 of the first type until the robot arm 110 changes to the operable state.

Figure 6:
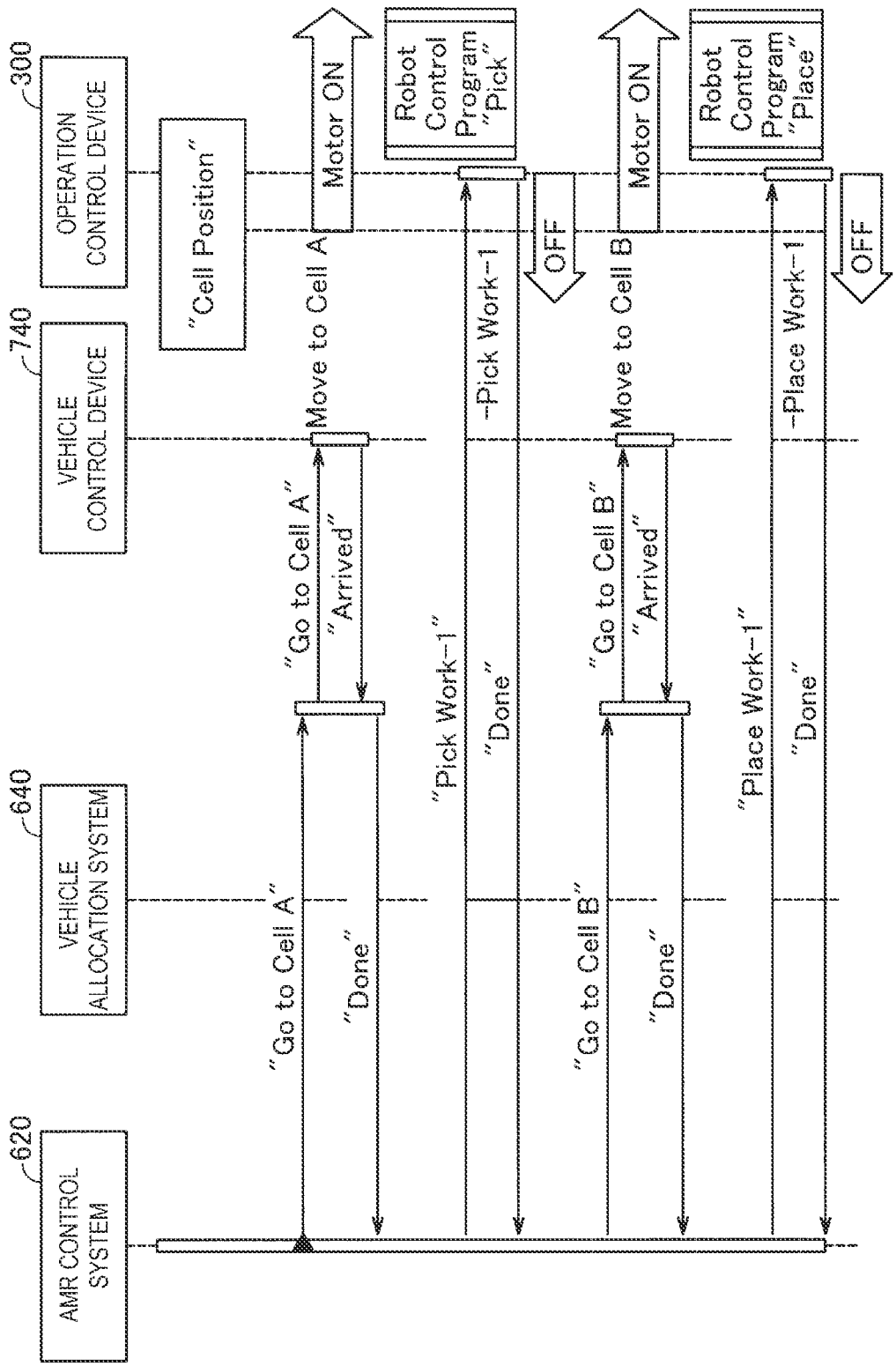
FIG. 6 is a chart showing exchange of commands among an AMR control system, a vehicle allocation system, a vehicle control section, and an operation control device.

FIG. 6 is a chart showing exchange of commands among the AMR control system 620, the vehicle allocation system 640, the vehicle control section 740 of the vehicle 700, and the operation control device 300 of the robot 100 at the time when the processing is performed according to FIGS. 4 and 5.

In an example shown in FIG. 6, first, the AMR control system 620 transmits a "Go to Cell A" command (see the upper left part of FIG. 6). The "Go to Cell A" command is received by the vehicle control section 740 through the vehicle allocation system 640. Then, the operation control device 300 of the robot 100 stops the supply of electric power to the servomotor 410 of the robot arm 110. The vehicle control section 740 of the vehicle 700 starts movement of the vehicle 700 to the next work station WS1 represented by "A" (see S100 in FIG. 4). This processing is represented by "Move to Cell A" not surrounded by quotation marks in the upper right part of FIG. 6.

Halfway in the movement to the next work station WS1, when the vehicle 700 reaches the position where power supply to the servomotor 410 should be started, the operation control device 300 starts the supply of electric power to the servomotor 410 of the robot arm 110 (see steps S200 to S400 in FIG. 4). This processing is represented by an arrow of "Motor ON" in the middle right part of FIG. 6. The position where power supply to the servomotor 410 should be started is represented by "Cell Position" in the upper right part of FIG. 6 (see S200 in FIG. 4).

The work station WS1 represented by "A" in the "Go to Cell A" command is the work station of the first type in which the robot arm 110 is driven to perform work. Accordingly, the determination in step S300 in FIG. 4 is Yes. To facilitate understanding of the technique, the processing in step S300 in FIG. 4 is not shown in FIG. 6.

When the vehicle 700 arrives at the work station WS1, the vehicle control section 740 transmits an "Arrived" command (see the upper center of FIGS. 6 and S500 in FIG. 4). The "Arrived" command is received by the AMR control system 620 through the vehicle allocation system 640 as a "Done" command representing execution completion of a command.

The AMR control system 620 transmits a "Pick Work-1" command (see the center of FIG. 6). The "Pick Work-1" command is received by the operation control device 300 of the robot 100 through the vehicle allocation system 640 and the vehicle control section 740. The operation control device 300 drives the robot arm 110 according to a robot control program and performs work in the work station WS1 (see S700 in FIG. 4). In the example shown in FIG. 6, work for lifting the workpiece WP is executed. This processing is represented by "Robot Control Program "Pick"" in the middle right part of FIG. 6.

When the work is completed, the operation control device 300 of the robot 100 transmits the "Done" command representing execution completion of a command (see the middle part of FIG. 6). The "Done" command is received by the AMR control system 620 through the vehicle control section 740 and the vehicle allocation system 640.

Thereafter, prior to the vehicle control section 740 of the vehicle 700 starting movement of the vehicle 700 to the next work station WS, the operation control device 300 of the robot 100 stops the supply of electric power to the servomotor 410 of the robot arm 110 (see S100 in FIG. 4). This processing is represented by an arrow of "OFF" in the middle right part of FIG. 6.

The AMR control system 620 transmits a command "Go to Cell B" (see the middle left part of FIGS. 6 and S900 in FIG. 4). The command "Go to Cell B" is received by the vehicle control section 740 through the vehicle allocation system 640. Then, the vehicle control section 740 of the vehicle 700 starts movement of the vehicle 700 to the next work station WS2 represented by "B" (see "Move to Cell B" in the lower right part of FIGS. 6 and S100 in FIG. 4).

Halfway in the movement to the next work station WS2, when the vehicle 700 reaches the position where power supply to the servomotor 410 should be started, the operation control device 300 starts supply of electric power to the servomotor 410 of the robot arm 110 (see "Motor ON" in the lower right part of FIGS. 6 and S200 to S400 in FIG. 4).

When the vehicle 700 arrives at the work station WS2, the vehicle control section 740 transmits the "Arrived" command (see the lower center of FIGS. 6 and S500 in FIG. 4). The "Arrived" command is received by the AMR control system 620 through the vehicle allocation system 640 as the "Done" command.

The AMR control system 620 transmits a "Place Work-1" command (see the lower center of FIG. 6). The "Place Work-1" command is received by the operation control device 300 of the robot 100 through the vehicle allocation system 640 and the vehicle control section 740. Then, the operation control device 300 drives the robot arm 110 according to the robot control program and performs work in the work station WS2 (see S700 in FIG. 4). In the example shown in FIG. 6, work for placing the gripped workpiece WP is executed in the work station WS1 (see "Robot Control Program "Place"" in the lower right part of FIG. 6).

When the work is completed, the operation control device 300 transmits the "Done" command (see the lower center of FIG. 6). The "Done" command is received by the AMR control system 620 through the vehicle control section 740 and the vehicle allocation system 640.

Thereafter, prior to the vehicle control section 740 of the vehicle 700 starting movement of the vehicle 700 to the next work station WS, the operation control device 300 of the robot 100 stops the supply of electric power to the servomotor 410 of the robot arm 110 ("OFF" in the lower right part of FIGS. 6 and S100 in FIG. 4).

According to this embodiment, the vehicle 700 moves in the state in which electric power is not supplied to the servomotor 410 of the robot arm 110 ("Move to Cell A", "Move to Cell B", and an arrow of "Motor ON" in the right part of FIG. 6). Accordingly, it is possible to reduce electric power consumed by the robot arm 110 compared with a form of continuously supplying electric power to the servomotor 410 of the robot arm 110 while the vehicle 700 is moved.

The vehicle 700 is arranged in the work station WS1 or WS2 of the first type in the state in which electric power is supplied to the servomotor 410 of the robot arm 110 (see "Motor ON" in the right part of FIG. 6). Accordingly, it is possible to advance start timing of work in the work station WS1 or WS2 of the first type compared with a form of starting the supply of electric power to the servomotor 410 after the vehicle 700 arrives at the work station WS1 or WS2 of the first type.

Further, since electric power is not supplied to the servomotor 410 of the robot arm 110, even when the operation control device 300 malfunctions or noise is mixed in a command to the servomotor 410 of the robot arm 110, the robot arm 110 does not perform an unexpected movement and damage structures around the robot arm 110.

The autonomous mobile robot 1 in this embodiment is referred to as "robot system" as well. The servomotor 410 is referred to as "electric motor" as well. The camera 720 and the vehicle control section 740 are referred to as "position detecting section" as well. The RAM 742 is referred to as "storing section" as well.

The operation mode for moving the vehicle 700 in the state in which electric power is not supplied to the servomotor 410 (see S100 in FIG. 4), starting supply of electric power to the servomotor 410 during the movement of the vehicle 700 (see S400), and arranging the vehicle 700 in the work station WS1 or WS2 of the first type in the state in which electric power is supplied to the servomotor 410 (see S500) is referred to as "first operation mode" as well (see Sta in FIG. 4).

The operation mode for moving the vehicle 700 in the state in which electric power is not supplied to the servomotor 410 (see S100) and arranging the vehicle 700 in the work station WS0 of the second type in the state in which electric power is not supplied to the servomotor 410 (see S500) is referred to as "second operation mode" as well (see Stc in FIG. 4).

A3. Modifications of the Start Condition

In the first embodiment, the processing leading to the supply of electric power to the servomotor 410 of the robot arm 110 is executed based on the determination result about whether the present position is the position where power supply to the servomotor 410 should be started (see S200 and S400 in FIGS. 4 and S220 in FIG. 5). However, the determination about whether the start condition for power supply in S200 in FIG. 4 is satisfied can also be performed by other methods. In the following explanation, modifications of the method of determining whether the start condition for power supply is satisfied are explained.

(1) Modification 1 of the Start Condition

Figure 7:
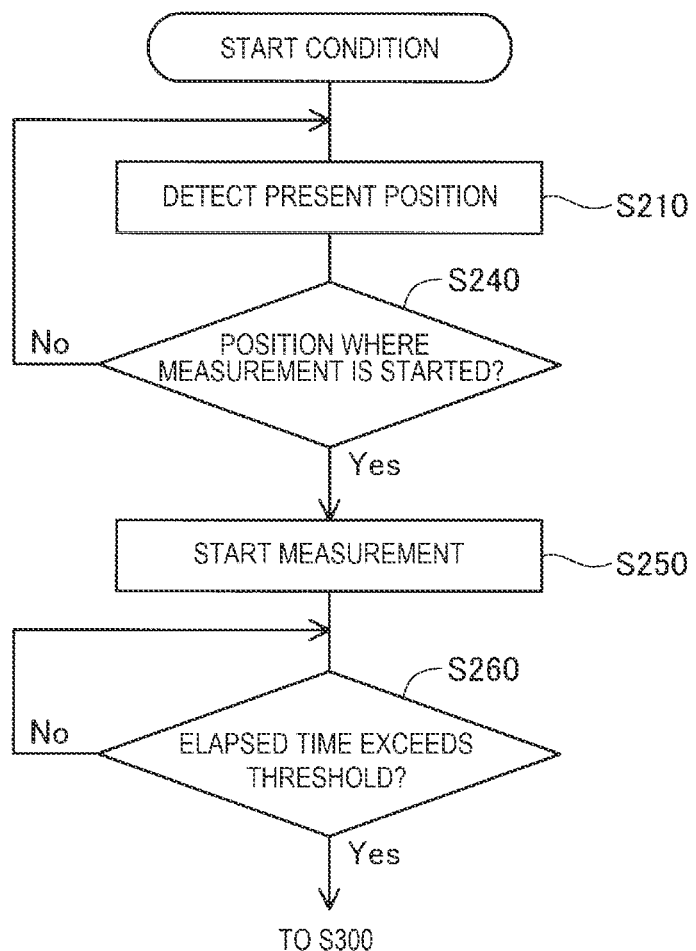
FIG. 7 is a flowchart showing content of a modification 1 of the determination processing in step S200 in FIG. 4.

FIG. 7 is a flowchart showing content of a modification 1 of the determination processing in step S200 in FIG. 4. In step S210, the vehicle control section 740 detects a present position. Processing in step S210 in FIG. 7 is the same as the processing in step S210 in FIG. 5.

In step S240, the vehicle control section 740 determines whether the present position is a position where measurement of an elapsed time should be started. Information concerning the position where measurement of an elapsed time should be started is stored in the RAM 742 of the vehicle control section 740 in advance together with the information concerning the route for moving among the work stations WS1, WS2, and WS0.

The information concerning the position where measurement of an elapsed time should be started can be, for example, information concerning a marker provided in the route for moving among the work stations WS1, WS2, and WS0. When the present position is a position where a specific marker is photographed in a specific size and at a specific angle by the camera 720, the vehicle control section 740 can determine that the present position is the position where measurement of an elapsed time should be started. The specific marker may not be provided. Components included in the work stations WS1, WS2, and WS0 and angles and sizes of the components photographed by a camera can be the information concerning the position where power supply should be started. The position where measurement of an elapsed time should be started can be a position of the work station WS in which the vehicle 700 is arranged when the vehicle 700 starts movement.

When the present position is not the position where measurement of an elapsed time should be started, the processing returns to step S210. When the present position is the position where power supply to the servomotor 410 should be started, the processing proceeds to step S250.

In step S250, the vehicle control section 740 starts measurement of an elapsed time. More specifically, measurement of time is performed by the CPU 741 of the vehicle control section 740. A functional section of the CPU 741 that measures time is shown in FIG. 1 as a timer 744.

In step S260 in FIG. 7, the vehicle control section 740 determines whether the elapsed time exceeds a threshold. Information concerning the threshold of the elapsed time is stored in the RAM 742 of the vehicle control section 740 in advance together with the information concerning the route for moving among the work stations WS1, WS2, and WS0.

When the elapsed time does not exceed the threshold, the processing returns to step S260. When the elapsed time exceeds the threshold, the processing proceeds to step S300.

In this modification, when power supply conditions including a condition that an elapsed time from when the vehicle 700 passes the position where measurement of an elapsed time should be started exceeds the threshold are satisfied during the movement of the vehicle 700, supply of electric power to the servomotor 410 of the robot arm 110 is started (see S240 and S260 in FIGS. 7 and S200 to S400 in FIG. 4).

With such a form, by appropriately setting the position where measurement of an elapsed time should be started and the threshold of the elapsed time, the vehicle 700 can be arranged in the work station WS1 or WS2 of the first type in the operable state of the robot arm 110. Accordingly, it is unnecessary to hold off a start of work in the work station WS1 or WS2 of the first type until the robot arm 110 changes to the operable state.

(2) Modification 2 of the Start Condition

Figure 8:
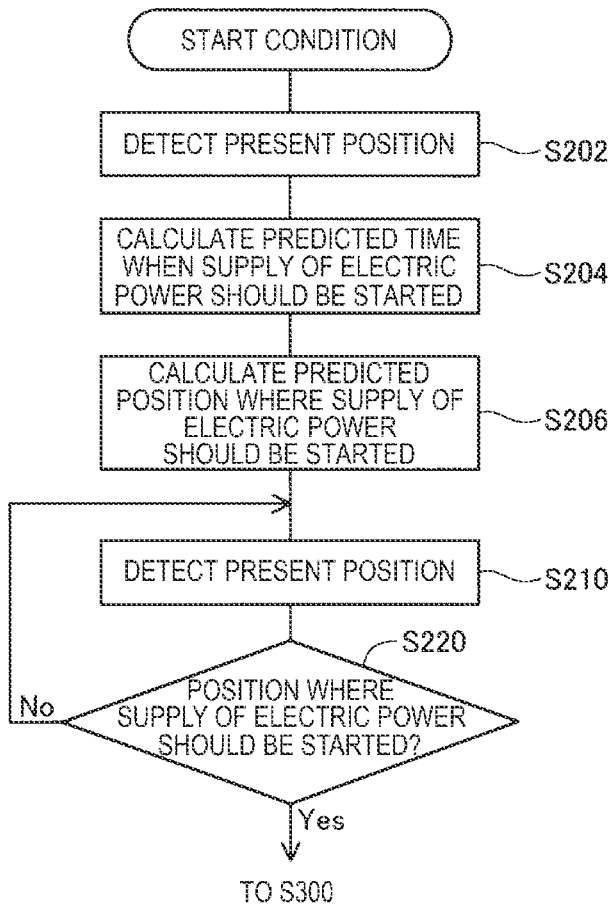
FIG. 8 is a flowchart showing content of a modification 2 of the determination processing in step S200 in FIG. 4.

FIG. 8 is a flowchart showing content of a modification 2 of the determination processing in step S200 in FIG. 4. In processing shown in FIG. 8, the processing in steps S202, S204, and S206 is executed prior to the processing in step S210 in FIG. 5. Otherwise, the modification 2 of the start condition is the same as the first embodiment.

In step S202, the vehicle control section 740 detects a present position. The processing in step S202 in FIG. 8 is the same as the processing in step S210 in FIG. 5.

In step S204, the vehicle control section 740 calculates, based on a route R10 on which the vehicle 700 moves to the work station WS of the first type at a destination and speed of the movement of the vehicle 700 on the route R10, time when the vehicle 700 arrives at the work station WS of the first type.

Figure 9:
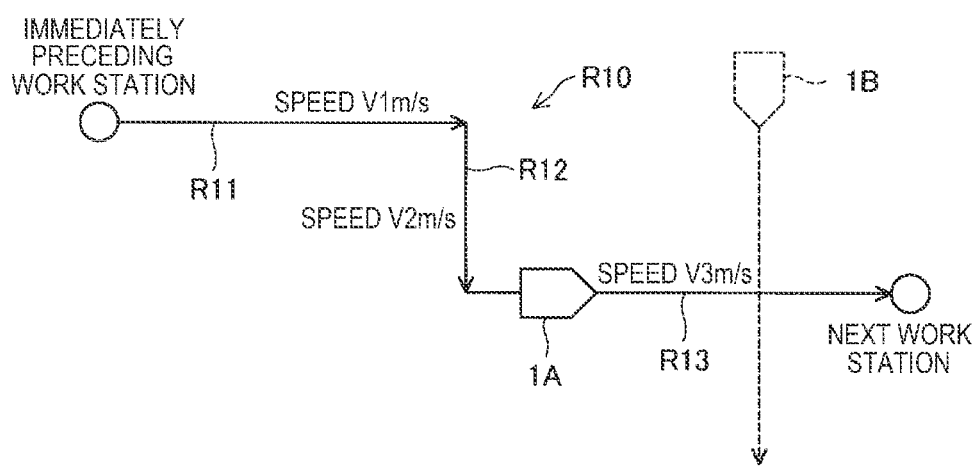
FIG. 9 is an explanatory diagram showing speeds of movement of a vehicle designated in sections of a route on which the vehicle moves to a work station of a first type.

FIG. 9 is an explanatory diagram showing speeds V1 to V3 of movement of the vehicle 700 designated in sections R11 to R12 of the route R10 on which the vehicle 700 moves to the work station WS of the first type. In a first section R11 of the route R10, V1 m/s is designated as the speed of the movement of the vehicle 700. In a second section R12 of the route R10, V2 m/s is designated as the speed of the movement of the vehicle 700. In a third section R13 of the route R10, V3 m/s is designated as the speed of the movement of the vehicle 700. These kinds of information are stored in the RAM 742 of the vehicle control section 740 in advance together with information concerning a route including information concerning distances of sections.

The vehicle control section 740 calculates, based on the route R10 on which the vehicle 700 moves to the work station WS of the first type at the destination and the time when the vehicle 700 arrives at the work station WS of the first type, predicted time going back from arrival time by a preparation time sufficient from when the supply of electric power to the servomotor 410 is started until the robot arm 110 changes to a state in which the robot arm 110 can start work. The predicted time obtained by the processing in step S204 is predicted time when the supply of electric power to the servomotor 410 should be started. The vehicle control section 740 stores the obtained predicted time in the RAM 742.

In step S206, the vehicle control section 740 calculates, based on the route R10 on which the vehicle 700 moves to the work station WS of the first type at the destination and the predicted time, a predicted position on the route R10 where the vehicle 700 is located at the predicted time. The vehicle control section 740 stores the obtained predicted position in the RAM 742 as a position where power supply to the servomotor 410 should be started. Information concerning the predicted position can be various kinds of information as explained in the processing in step S220 in FIG. 5. Various predicted positions can be specified by changing sizes and angles at the time when the marker and the components included in the work stations WS1, WS2, and WS0 are photographed by the camera 720.

In step S210, the vehicle control section 740 detects a present position. The processing in step S210 in FIG. 8 is the same as the processing in step S210 in FIG. 5.

In step S220, the vehicle control section 740 determines whether the present position is a position where power supply to the servomotor 410 should be started. The processing in step S220 in FIG. 8 is the same as the processing in step S220 in FIG. 5. However, the position where power supply to the servomotor 410 should be started is the predicted position calculated in step S206. The subsequent processing is the same as the processing in the first embodiment (see S220 and subsequent steps in FIGS. 4 and S200 and subsequent steps in FIG. 5).

In this modification, when power supply conditions including a condition that the position of the vehicle 700 reaches the predicted position are satisfied during the movement of the vehicle 700, supply of electric power to the servomotor 410 of the robot arm 110 is started (see S206 and S220 in FIGS. 8 and S200 to S400 in FIG. 4).

With such a form, it is highly likely that the vehicle 700 can be arranged in the work station WS1 or WS2 of the first type in the operable state of the robot arm 110. Accordingly, it is possible to reduce likelihood that a start of work is held off in the work station WS1 or WS2 of the first type until the robot arm 110 changes to the operable state.

(3) Modification 3 of the Start Condition

Figure 10:
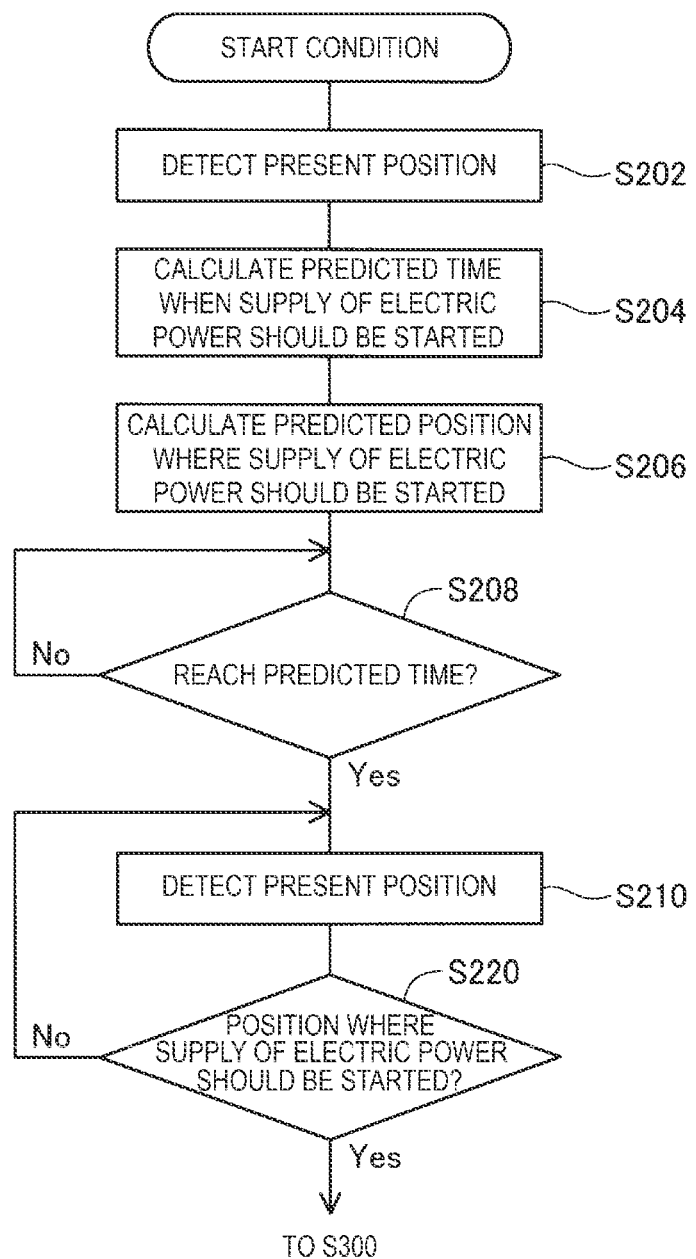
FIG. 10 is a flowchart showing content of a modification 3 of the determination processing in step S200 in FIG. 4.

FIG. 10 is a flowchart showing content of a modification 3 of the determination processing in step S200 in FIG. 4. In processing shown in FIG. 10, the processing in step S208 is executed between step S206 and step S210 in FIG. 8. Otherwise, the modification 3 of the start condition is the same as the modification 2 of the first embodiment.

In step S208, the vehicle control section 740 determines whether present time is the predicted time obtained in step S204. The predicted time obtained in step S204 is predicted time when supply of electric power to the servomotor 410 should be started. When the present time is not the predicted time, the processing returns to step S208. When the present time is the predicted time, the processing proceeds to step S210. The subsequent processing is the same as the processing in the modification 2.

In this modification, when power supply conditions including a condition that the present time reaches the predicted time are satisfied during the movement of the vehicle 700, supply of electric power to the servomotor 410 of the robot arm 110 is started (see S208 and S220 in FIG. 8 and S200 to S400 in FIG. 4).

In such a form as well, it is highly likely that the vehicle 700 can be arranged in the work station WS1 or WS2 of the first type in the operable state of the robot arm 110. Accordingly, it is possible to reduce likelihood that a start of work is held off in the work station WS1 or WS2 of the first type until the robot arm 110 changes to the operable state.

In the autonomous mobile robot 1, when routes of a plurality of autonomous mobile robots 1 cross, one autonomous mobile robot 1 stays on standby in a position before a crossing point on the routes until the other autonomous mobile robot 1 passes the crossing point. In FIG. 9, the autonomous mobile robot 1 on standby is shown as an autonomous mobile robot 1A. The autonomous mobile robot 1 passing the crossing point first is shown as an autonomous mobile robot 1B.

As a result, the autonomous mobile robot 1 reaches the predicted position obtained in step S206 at the predicted time obtained in step S204 in some cases and does not reach the predicted position yet in other cases. The autonomous mobile robot 1 has not already passed the predicted position obtained in step S206 at the predicted time obtained in step S204.

In this modification, the recognition and the determination of the present position are executed after the present time reaches the predicted time obtained in step S204 (see S208 to S220 in FIG. 10). Accordingly, electric power is not supplied to the servomotor 410 of the robot arm 110 in spite of the fact that the autonomous mobile robot 1 does not reach the predicted position obtained in step S206 yet. Accordingly, compared with the modification 1, it is possible to reduce power consumption of the robot arm 110.

In this modification, the recognition and the determination of the present position is not executed until the present time reaches the predicted time obtained in step S204 (see S210 and S220 in FIG. 10). Accordingly, the number of times of repetition of the recognition and the determination of the present position, which requires a processing load larger than a processing load in the processing in step S208 for measuring a time, is smaller than the number of times in the modification 2. Accordingly, it is possible to reduce a processing load of the vehicle control section 740 compared with the modification 2.

B. Second Embodiment

In a second embodiment, the processing for stopping the supply of electric power to the servomotor 410 of the robot arm 110 prior to the start of the movement of the vehicle 700 is not performed depending on a case (see S100 in FIG. 4). Otherwise, the second embodiment is the same as the first embodiment.

Figure 11:
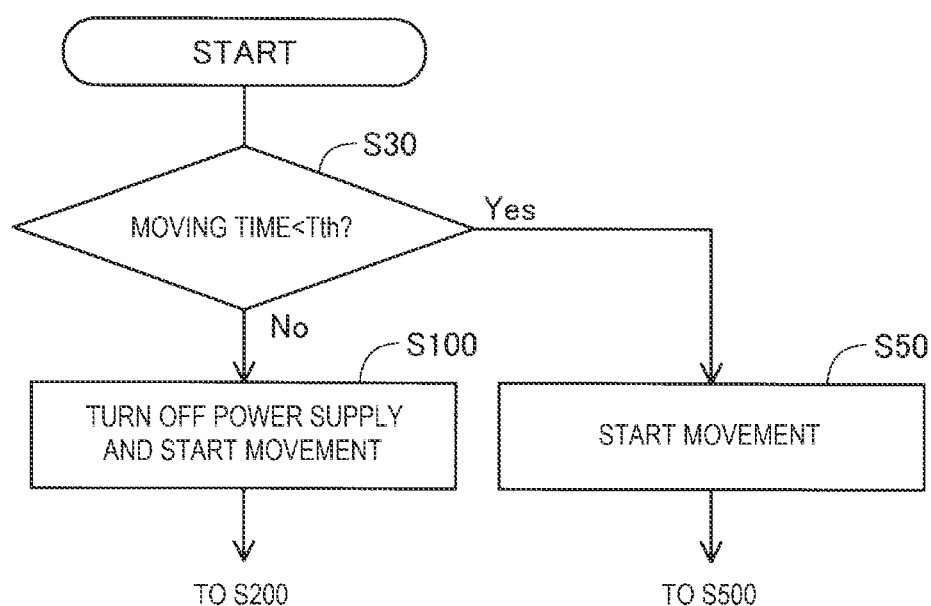
FIG. 11 is a flowchart showing processing concerning control of power supply to the servomotor at the time when the autonomous robot moves among the work stations in a second embodiment.

FIG. 11 is a flowchart showing processing concerning control of power supply to the servomotor 410 at the time the autonomous mobile robot 1 moves among the work stations WS1, WS2, and WS0. In the processing shown in FIG. 11, determination processing in step S30 is performed prior to the processing in step S100 in FIG. 4. According to a result of the determination in step S30, the processing in steps S100 to S400 is performed as in the first embodiment or the processing in steps S100 to S400 is skipped and the processing in step S500 is performed. Otherwise, the processing concerning control of power supply to the servomotor 410 shown in FIG. 11 is the same as the processing concerning control of power supply to the servomotor 410 shown in FIG. 4.

In step S30, the vehicle control section 740 of the vehicle 700 calculates, based on a route on which the vehicle 700 moves to the work station WS at the next destination and speed of the movement of the vehicle 700 on the route, a moving time required for the movement to the work station WS at the next destination. The vehicle control section 740 determines whether the moving time is shorter than a predetermined time threshold Tth.

When the moving time is not shorter than the predetermined time threshold Tth, the processing proceeds to step S100. When the moving time is shorter than the predetermined time threshold Tth, the processing proceeds to step S50.

In step S50, the vehicle control section 740 of the vehicle 700 starts movement of the vehicle 700 to the next work station WS. In step S50, the operation control device 300 of the robot 100 does no stop the supply of electric power to the servomotor 410 of the robot arm 110 prior to the start of the movement. After step S50, the processing proceeds to step S500.

When the processing in step S50 is performed, the vehicle 700 moves in a state in which electric power is supplied to the servomotor 410 of the robot arm 110. The vehicle 700 is arranged in the work station WS in the state in which electric power is supplied to the servomotor 410 of the robot arm 110 (see S50 in FIGS. 11 and S500 in FIG. 4).

OFF and ON of the supply of electric power to the servomotor 410 of the robot arm 110 are executed during movement in a short distance, when the vehicle 700 arrives at the work station WS1 or WS2 of the first type, a situation could occur in which the robot arm 110 is not in the operable state. As a result, in the work station WS1 or WS2 of the first type, it is necessary to hold off a start of work until the robot arm 110 changes to the operable state. However, with the form of the second embodiment, by appropriately setting the predetermined time threshold Tth, it is possible to reduce likelihood that such a situation occurs.

An operation mode executed when the time required for the movement to the work station WS1 or WS2 of the first type is shorter than the predetermined threshold Tth (see S30 in FIG. 11), that is, an operation mode for moving the vehicle 700 in the state in which electric power is supplied to the servomotor 410 (see S50) and arranging the vehicle 700 in the work station WS1 or WS2 of the first type in the state in which electric power is supplied to the servomotor 410 (see S500 in FIG. 4) is referred to as "third operation mode" as well.

Figure 12:
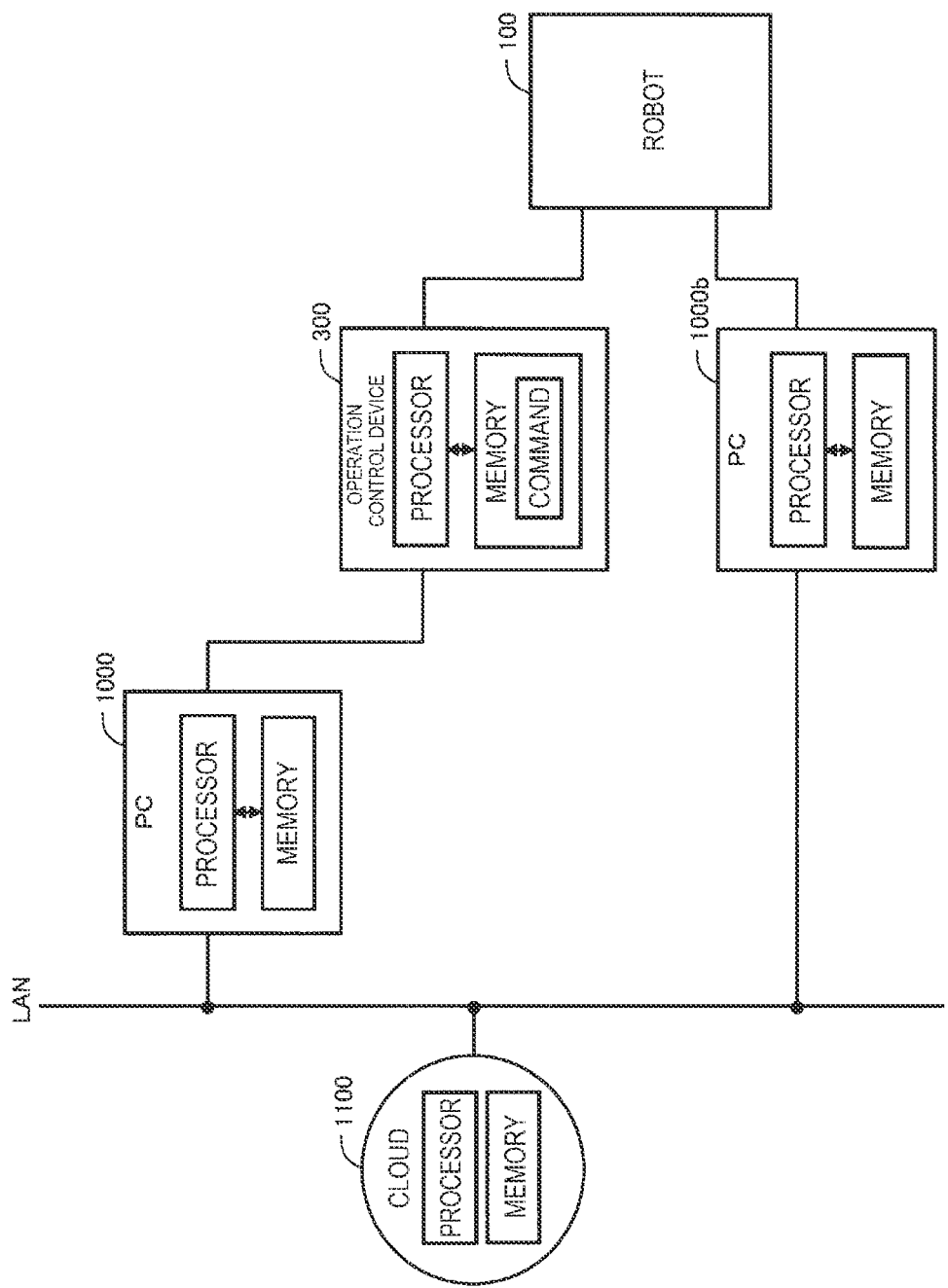
FIG. 12 is a conceptual diagram showing an example in which a control device for a robot is configured by a plurality of processors.

C. Third Embodiment (1) FIG. 12 is a conceptual diagram showing an example in which a control device for a robot is configured by a plurality of processors. In this example, besides the robot 100 and the operation control device 300 for the robot 100, personal computers 1000 and 1000b and a cloud service 1100 provided via a network environment such as a LAN are drawn. The personal computers 1000 and 1000b respectively include processors and memories. A processor and a memory can also be used in the cloud service 1100. The processors execute a computer-executable command. It is possible to realize a part or all of the functions of the operation control device 300 and the host management device 600 using a part or all of these plurality of processors. It is also possible to realize, using a part or all of these plurality of memories, a storing section that stores various kinds of information.

Figure 13:
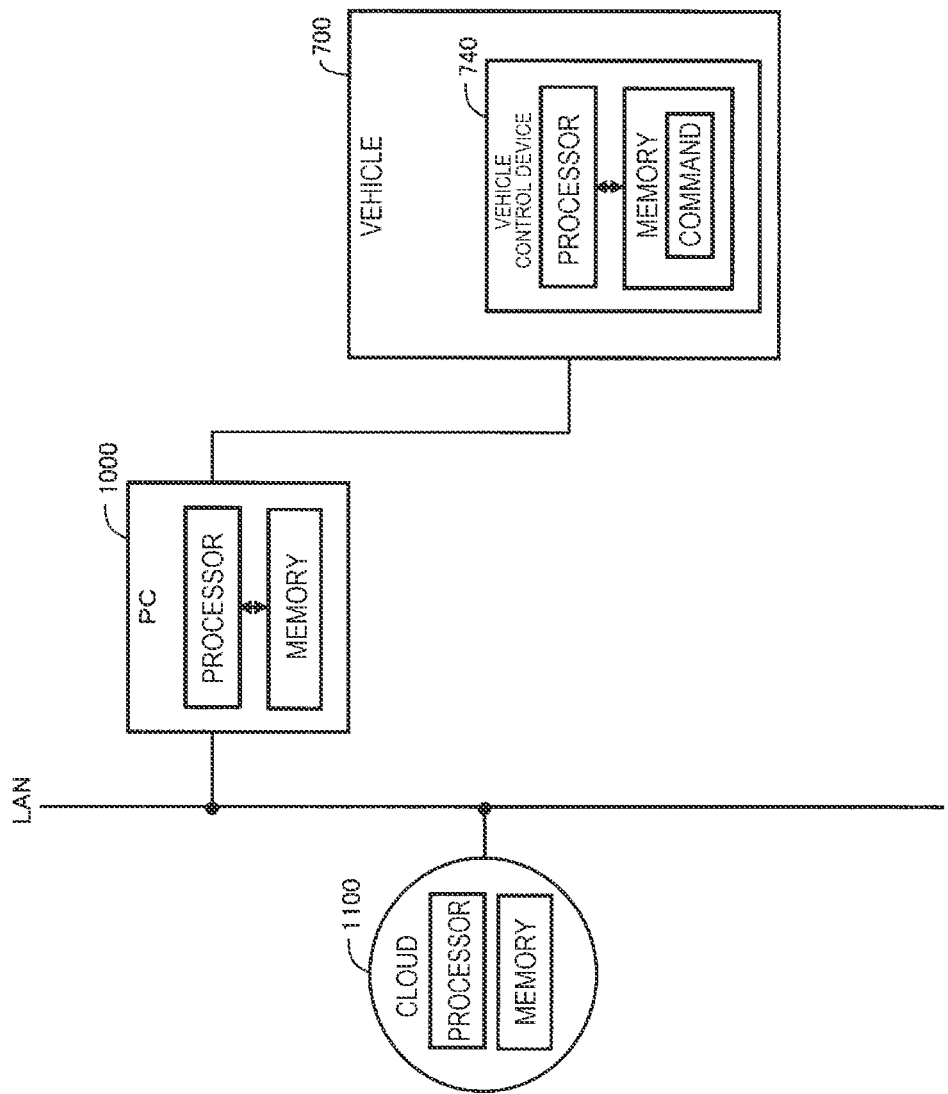
FIG. 13 is a conceptual diagram showing an example in which a control device for a vehicle is configured by a plurality of processors.

(2) FIG. 13 is a schematic diagram showing an example in which a control device for a vehicle is configured by a plurality of processors. In this example, besides the vehicle 700 and the vehicle control section 740 of the vehicle 700, the personal computers 1000 and 1000b and the cloud service 1100 provided via a network environment such as a LAN are drawn. The personal computers 1000 and 1000b respectively include processors and memories. A processor and a memory can also be used in the cloud service 1100. The processors execute a computer-executable command. It is possible to realize a part or all of the functions of the vehicle control section 740 and the host management device 600 using a part or all of these plurality of processors. It is also possible to realize, using a part or all of these plurality of memories, a storing section that stores various kinds of information.

Figure 14:
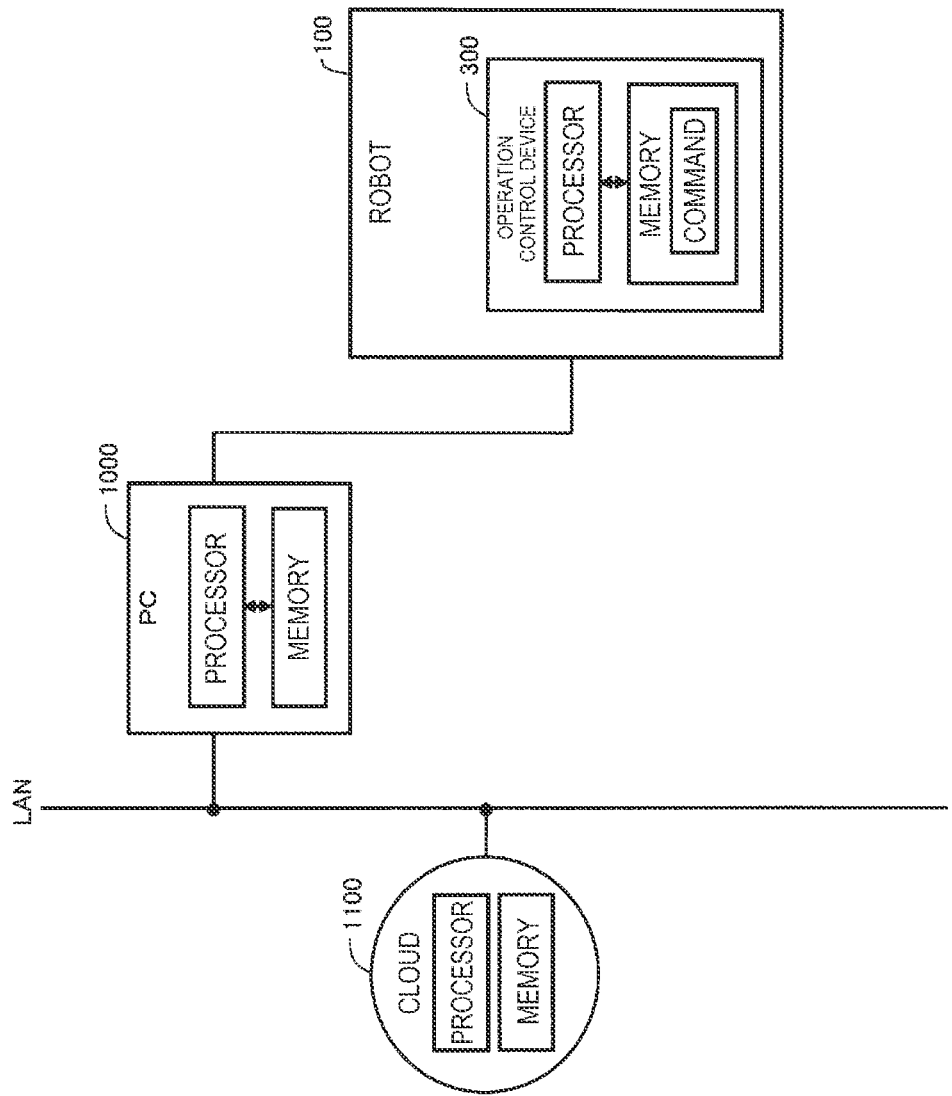
FIG. 14 is a conceptual diagram showing another example in which a control device for a robot is configured by a plurality of processors.

(3) FIG. 14 is a conceptual diagram showing another example in which a control device for a robot is configured by a plurality of processors. This example is different from the example shown in FIG. 12 in that the operation control device 300 for the robot 100 is housed in the robot 100. In this example as well, it is possible to realize a part or all of the functions of the operation control device 300 and the host management device 600 using a part or all of these plurality of processors. It is also possible to realize, using a part or all of these plurality of memories, a storing section that stores various kinds of information.

Figure 15:
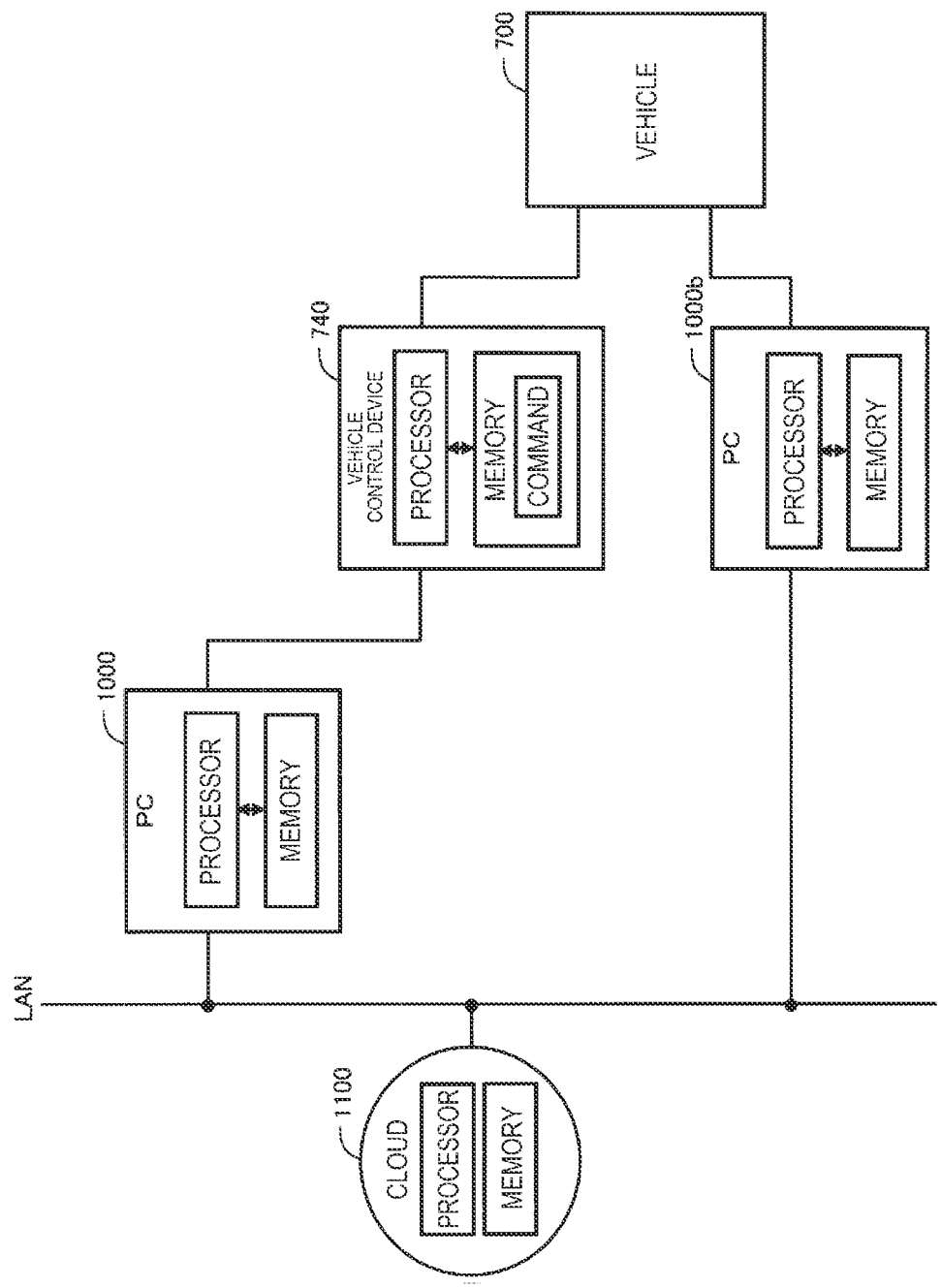
FIG. 15 is a conceptual diagram showing another example in which a control device for a vehicle is configured by a plurality of processors.

(4) FIG. 15 is a conceptual diagram showing another example in which a control device for a vehicle is configured by a plurality of processors. This example is different from the example shown in FIG. 13 in that the vehicle control section 740 is disposed on the outside of the vehicle 700. In this example as well, it is possible to realize a part or all of the functions of the vehicle control section 740 and the host management device 600 using a part or all of these plurality of processors. It is also possible to realize, using a part or all of these plurality of memories, a storing section that stores various kinds of information.

D. Other Embodiments

D1. Another Aspect 1

(1) In the embodiments explained above, the technique of the present disclosure is explained taking, as an example, the robot 100, which is the vertical articulated robot including one robot arm 110. However, the technique of the present disclosure can also be applied to a SCARA robot. The technique of the present disclosure can also be applied to a robot including a plurality of arms such as a robot including two arms.

(2) In the embodiments explained above, the work station WS0 is the charging station (see the upper right part of FIG. 2). However, the work station WS0 can also be other stations in which the robot arm 110 is not driven. For example, a station in which a robot arm is not driven can be a station in which the autonomous mobile robot 1 not scheduled to perform work in a work station stays on standby for a predetermined period or a station in which a human performs work on the autonomous mobile robot 1.

(3) In the embodiments explained above, the host management device 600 is explained as one device. However, the AMR control system 620 and the vehicle allocation system 640 realized by the host management device 600 in the embodiments may be respectively realized by separate devices.

(4) In the embodiments explained above, prior to the start of movement of the vehicle 700, the supply of electric power to the servomotor 410 of the robot arm 110 is stopped. However, the stop of the supply of electric power to the servomotor 410 may be performed after the start of movement of the vehicle 700. That is, in a part of movement to a work station of the first type, the vehicle 700 only has to be moved in a state in which electric power is not supplied to the servomotor 410 functioning as the electric motor.

(5) In the embodiments explained above, the supply of electric power to the servomotor 410 of the robot arm 110 is stopped. Further, a form can also be adopted in which a vehicle moves in a state in which supply of electric power to the operation control device 300 is stopped.

(6) In the embodiments explained above, the start condition in step S200 in FIG. 4 is a static condition that does not change according to a situation. However, the start condition can also be a dynamic condition that changes according to a situation.

(7) In the embodiments explained above, the position of the vehicle 700 is detected based on the information obtained from the IMU 710 and the camera 720 provided in the vehicle 700. However, the position of a vehicle may be detected by other methods. For example, the vehicle control section 740 may recognize, based on information obtained from the force detecting section 190, a tilt of the vehicle 700, moving speed including the speed and the direction of the vehicle 700, and a present position of the vehicle 700.

For example, the vehicle can be a vehicle including an ultrasonic sensor and a laser sensor. The position of the vehicle may be detected based on those sensors. Various sensors used for position detection of the vehicle such as a camera, an ultrasonic sensor, and a laser sensor may be attached to a robot or may be provided in an immobile structure other than the vehicle.

(8) In the embodiments explained above, before the supply of electric power in step S400 and before the execution of the work in step S700, it is determined whether the target work station WS is the work station of the first type (see S300 and S600 in FIG. 4). When the start condition for power supply used in step S200 is stored in the RAM 742 of the vehicle control section 740, the autonomous mobile robot 1 may perform processing in the case in which the target work station WS is the work station of the first type. The determination about whether the next work station WS is the work station of the first type may be performed first. Thereafter, division of the processing may be performed using a result of the determination. For example, the processing in the second embodiment may be performed, after such determination, only when the next station WS is the work station of the first type (see S30 and S50 in FIG. 11).

D2. Another Aspect 2

In the first embodiment, when the power supply conditions including the condition that the position of the vehicle 700 reaches the position where the supply of electric power should be started are satisfied during the movement of the vehicle 700, the supply of electric power to the servomotor 410 of the robot arm 110 is started (see S220 in FIGS. 5 and S200 to S400 in FIG. 4). However, the power supply conditions can be other conditions as explained in the modifications of the first embodiment (see FIGS. 7 to 10). The determination of the power supply conditions is not limited to the CPU 741 of the vehicle control section 740 and may be performed by another processor such as the CPU 601 of the host management device 600.

D3. Another Aspect 3

In the modification 1 of the first embodiment, when the power supply conditions including the condition that the elapsed time from when the vehicle 700 passes the position where the measurement of an elapsed time should be started exceeds the threshold are satisfied during the movement of the vehicle 700, the supply of electric power to the servomotor 410 of the robot arm 110 is started (see S240 and S260 in FIGS. 7 and S200 to S400 in FIG. 4). However, the power supply conditions can also be other conditions as explained in the first embodiment and the other modifications of the first embodiment (see FIGS. 7 to 10).

The predetermined condition for starting the measurement of an elapsed time can also be other conditions such as a condition that a state of a hard switch provided in a vehicle changes and a condition that a state of a hard switch provided in a component other than the vehicle changes. A condition that the intensity of a radio wave received by a device, which is provided in the vehicle and receives the radio wave, is equal to or higher than a threshold can also be the predetermined condition for staring the measurement of an elapsed time.

Further, the condition for starting the measurement of an elapsed time is not limited to the condition concerning a place where the vehicle is located and can also be other conditions. For example, the condition for starting the measurement of an elapsed time can also be a condition concerning a state of the autonomous mobile robot 1 and a state of the work station WS (see S210 and S240 in FIG. 7).

D4. Another Aspect 4

(1) In the modification 2 of the first embodiment, when the power supply conditions including the condition that the position of the vehicle 700 reaches the predicted position are satisfied during the movement of the vehicle 700, the supply of electric power to the servomotor 410 of the robot arm 110 is started (see S206 and S220 in FIGS. 8 and S200 to S400 in FIG. 4). However, the power supply conditions can also be other conditions as explained in the first embodiment and the other modifications of the first embodiment (see FIGS. 7 to 10).

(2) In the embodiments, the information concerning the route for moving among the work stations WS1, WS2, and WS0 is stored in the RAM 742 of the vehicle control section 740 in advance prior the movement (see the lower center of FIG. 1). However, the host management device 600 may hold information concerning a route for moving among the work stations and give a moving instruction to a target point halfway in the route to the autonomous mobile robot 1. The autonomous mobile robot 1 may include a control section that realizes the functions of both of the vehicle control section 740 and the operation control device 300. The information concerning the route can also be stored in a storing section included in the control section.

D5. Another Aspect 5

(1) In the modifications 2 and 3 of the first embodiment, in step S204, the predicted time going back from the arrival time by the predetermined preparation time sufficient from when the supply of electric power to the servomotor 410 is started until the robot arm 110 changes to the state in which the robot arm 110 can start work is calculated. The preparation time sufficient from when the supply of electric power to the electric motor is started until the robot arm 110 changes to the state in which the work can be started may be a time of a predetermined fixed value or may be a time decided according to a state of the autonomous mobile robot 1 at that time.

(2) In the modification 3 of the first embodiment, when the power supply conditions including the condition that the present time reaches the predicted time are satisfied during the movement of the vehicle 700, the supply of electric power to the servomotor 410 of the robot arm 110 is started (see S208 and S220 in FIGS. 8 and S200 to S400 in FIG. 4). However, the power supply conditions can also be other conditions as explained in the first embodiment and the other modifications of the first embodiment (see FIGS. 7 to 10). For example, a form can also be adopted in which the processing in steps S210 and S220 is not performed and, when the present time reaches the predicted time, the supply of electric power to the electric motor of the robot arm is started.

D6. Another Aspect 6

In the second embodiment, when the moving time required for movement to the work station WS at the next destination is shorter than the predetermined time threshold Tth, the processing in steps S200 to S400 in FIG. 4 is not performed (see S30 and S50 in FIG. 11). However, a form can also be adopted in which such processing is not performed and the processing in steps S200 to S400 in FIG. is always performed irrespective of the moving time required for movement to the work station WS at the next destination.

D7. Another Aspect 7

In the embodiments, when the work station WS at the next destination is the work station WS0 of the second type, the processing in step S400 is not performed and the processing proceeds to step S500 (see S300 in FIG. 4). However, a form can also be adopted in which the supply of electric power to the electric motor of the robot arm is started irrespective of a type of the work station WS at the next destination.

E. Still Other Aspects

The present disclosure is not limited to the embodiments explained above and can be realized in various aspects in a range not departing from the gist of the present disclosure. For example, the present disclosure can also be realized by the following aspects. The technical features in the embodiments corresponding to technical features in the aspect described below can be substituted and combined as appropriate in order to solve a part or all of the problems of the present disclosure or in order to achieve a part or all of the effects of the present disclosure. If the technical features are not explained as essential technical features in this specification, the technical features can be deleted as appropriate.

(1) According to an aspect of the present disclosure, a control method for a robot system is provided. The robot system includes: a robot arm driven by an electric motor; and a vehicle that is movable and supports the robot arm. The control method includes: (a) a step of moving the vehicle to a work station of a first type; and (b) a step of driving the robot arm in the work station of the first type. The step (a) executes a first operation mode for, in a part of the movement to the work station of the first type, moving the vehicle in a state in which electric power is not supplied to the electric motor, starting supply of the electric power to the electric motor during the movement of the vehicle in the state in which the electric power is not supplied to the electric motor, and arranging the vehicle in the work station of the first type in a state in which the electric power is supplied to the electric motor.

In such a form, since the vehicle is moved in the state in which electric power is not supplied to the electric motor of the robot arm, it is possible to reduce electric power consumed by the robot arm compared with a form of continuously supplying electric power to the electric motor of the robot arm while the vehicle is moved. Since the vehicle is arranged in the work station of the first type in the state in which electric power is supplied to the electric motor of the robot arm, it is possible to advance start timing of work in the work station of the first type compared with a form of starting the supply of electric power to the electric motor after the vehicle arrives at the work station of the first type.

(2) In the control method in the aspect, the robot system may include: a position detecting section configured to detect a position of the vehicle; and a storing section storing information concerning a position where the supply of the electric power to the electric motor should be started. The step (a) may include, in the first operation mode, a step of starting the supply of the electric power to the electric motor when power supply conditions including a condition that the position of the vehicle reaches the position where the supply of the electric power should be started are satisfied during the movement of the vehicle.

In such a form, by appropriately setting the position where the supply of electric power should be started, it is possible to arrange the vehicle in the work station of the first type in an operable state of the robot arm. Accordingly, it is unnecessary to hold off the start of the work in the work station of the first type until the robot arm changes to the operable state.

(3) In the control method in the aspect, the robot system may include: a timer that can measure a time; and a storing section storing information concerning a threshold of an elapsed time. The step (a) may include, in the first operation mode, a step of starting the supply of the electric power to the electric motor when power supply conditions including a condition that an elapsed time from when a predetermined condition is satisfied exceeds the threshold are satisfied during the movement of the vehicle.

In such a form, by appropriately setting the predetermined condition and the threshold of the elapsed time, it is possible to arrange the vehicle in the work station of the first type in an operable state of the robot arm. Accordingly, it is unnecessary to hold off the start of the work in the work station of the first type until the robot arm changes to the operable state.

(4) In the control method in the aspect, the robot system may include a position detecting section configured to detect a position of the vehicle. The step (a) may include, in the first operation mode: a step of calculating, based on a route on which the vehicle moves to the work station of the first type and speed of the movement of the vehicle on the route, a predicted position on the route where the vehicle is located at predicted time going back, by a preparation time from when the supply of the electric power to the electric motor is started until the robot arm changes to a state in which the robot arm can start work, from time when the vehicle arrives at the work station of the first type; and a step of starting the supply of the electric power to the electric motor when power supply conditions including a condition that the position of the vehicle reaches the predicted position are satisfied during the movement of the vehicle.

In such a form, it is highly likely that the vehicle can be arranged in the work station of the first type in the operable state of the robot arm. Accordingly, it is possible to reduce likelihood that the start of the work is held off in the work station of the first type until the robot arm changes to the operable state.

(5) In the control method in the aspect, the robot system may include a timer that can measure a time. The step (a) may include, in the first operation mode: a step of calculating, based on a route on which the vehicle moves to the work station of the first type and speed of the movement of the vehicle on the route, predicted time going back, by a time from when the supply of the electric power to the electric motor is started until the robot arm changes to a state in which the robot arm can start work, from time when the vehicle arrives at the work station of the first type; and a step of starting the supply of the electric power to the electric motor when power supply conditions including a condition that present time reaches the predicted time are satisfied during the movement of the vehicle.

In such a form, it is highly likely that the vehicle can be arranged in the work station of the first type in the operable state of the robot arm. Accordingly, it is possible to reduce likelihood that the start of the work is held off in the work station of the first type until the robot arm changes to the operable state.

(6) In the control method in the aspect, the step (a) may execute the first operation mode executed when a time required for the movement to the work station of the first type is equal to or longer than a predetermined threshold, the first operation mode being for moving the vehicle in the state in which the electric power is not supplied to the electric motor and arranging the vehicle in the work station of the first type in the state in which the electric power is supplied to the electric motor.

When OFF and ON of the supply of the electric power to the electric motor of the robot arm are executed during movement in a short distance, a situation in which the robot arm is not in the operable state could occur when the vehicle arrives at the work station of the first type. In such a case, the start of the work needs to be held off until the robot arm changes to the operable state in the work station of the first type. However, in the form described above, by appropriately setting the predetermined threshold, it is possible to reduce likelihood that such a situation occurs.

(7) In the control method in the aspect, the control method may further include: (c) a step of moving the vehicle to a work station of a second type; and (d) a step of performing processing concerning the robot system without driving the robot arm in the work station of the second type. The step (c) may execute a second operation mode for moving the vehicle in the state in which the electric power is not supplied to the electric motor and arranging the vehicle in the work station of the second type in the state in which the electric power is not supplied to the electric motor.

In such a form, when the vehicle is moved to the work station of the second type in which the robot arm is not driven, the vehicle is moved in the state in which electric power is not supplied to the electric motor of the robot arm. Accordingly, it is possible to reduce electric power consumed by the robot arm compared with a form of supplying electric power to the electric motor while the vehicle is moved.

The present disclosure can also be realized in various forms other than the control method for the robot system. For example, the present disclosure can be realized in forms of the robot system, a computer program for realizing the control method for the robot system, and a non-transitory recording medium recording the computer program.

Not all of a plurality of constituent elements included in the aspects of the present disclosure explained above are essential. A part of the plurality of constituent elements can be changed, deleted, and substituted with new other constituent elements and a part of limited contents of the constituent elements can be deleted in order to solve a part or all of the problems described above or achieve a part or all of the effects described in this specification. A part or all of the technical features included in one aspect of the present disclosure described above can also be combined with a part or all of the technical features included in the other aspects of the present disclosure to form an independent aspect of the present disclosure in order to solve a part or all of the problems of the present disclosure or in order to achieve a part or all of the effects described in this specification.

What is claimed is:

1. A control method for a robot system,
the robot system including:
a robot arm driven by an electric motor; and
a vehicle that is movable and supports the robot arm,
the control method comprising:
(a) moving the vehicle to a work station of a first type; and
(b) driving the robot arm in the work station of the first type, wherein
the (a) executes a first operation mode for, in a part of the movement to the work station of the first type, moving the vehicle in a state in which electric power is not supplied to the electric motor, starting supply of the electric power to the electric motor during the movement of the vehicle in the state in which the electric power is not supplied to the electric motor, and arranging the vehicle in the work station of the first type in a state in which the electric power is supplied to the electric motor.

2. The control method according to claim 1, wherein the robot system includes:
a position detecting section configured to detect a position of the vehicle; and
a storing section storing information concerning a position where the supply of the electric power to the electric motor should be started, and
the (a) includes, in the first operation mode, starting the supply of the electric power to the electric motor when power supply conditions including a condition that the position of the vehicle reaches the position where the supply of the electric power should be started are satisfied during the movement of the vehicle.

3. The control method according to claim 1, wherein the robot system includes:
a timer that can measure a time; and
a storing section storing information concerning a threshold of an elapsed time, and
the (a) includes, in the first operation mode, starting the supply of the electric power to the electric motor when power supply conditions including a condition that an elapsed time from when a predetermined condition is satisfied exceeds the threshold are satisfied during the movement of the vehicle.

4. The control method according to claim 1, wherein the robot system includes a position detecting section configured to detect a position of the vehicle, and
the (a) includes, in the first operation mode:
calculating, based on a route on which the vehicle moves to the work station of the first type and speed of the movement of the vehicle on the route, a predicted position on the route where the vehicle is located at predicted time going back, by a preparation time from when the supply of the electric power to the electric motor is started until the robot arm changes to a state in which the robot arm can start work, from time when the vehicle arrives at the work station of the first type; and
starting the supply of the electric power to the electric motor when power supply conditions including a condition that the position of the vehicle reaches the predicted position are satisfied during the movement of the vehicle.

5. The control method according to claim 1, wherein
the robot system includes a timer that can measure a time, and
the (a) includes, in the first operation mode:
calculating, based on a route on which the vehicle moves to the work station of the first type and speed of the movement of the vehicle on the route, predicted time going back, by a time from when the supply of the electric power to the electric motor is started until the robot arm changes to a state in which the robot arm can start work, from time when the vehicle arrives at the work station of the first type; and
starting the supply of the electric power to the electric motor when power supply conditions including a condition that present time reaches the predicted time are satisfied during the movement of the vehicle.

6. The control method according to claim 1, wherein the (a) executes the first operation mode executed when a time required for the movement to the work station of the first type is equal to or longer than a predetermined threshold, the first operation mode being for moving the vehicle in the state in which the electric power is not supplied to the electric motor and arranging the vehicle in the work station of the first type in the state in which the electric power is supplied to the electric motor.

7. The control method according to claim 1, further comprising:
(c) moving the vehicle to a work station of a second type; and
(d) performing processing concerning the robot system without driving the robot arm in the work station of the second type, wherein
the (c) executes a second operation mode for moving the vehicle in the state in which the electric power is not supplied to the electric motor and arranging the vehicle in the work station of the second type in the state in which the electric power is not supplied to the electric motor.

* * * * *